US011959730B2

(12) United States Patent
Grate et al.

(10) Patent No.: US 11,959,730 B2
(45) Date of Patent: Apr. 16, 2024

(54) ARMORED CAB FOR BLAST PROTECTION

(71) Applicant: AM GENERAL LLC, South Bend, IN (US)

(72) Inventors: Steven D. Grate, Highland, MI (US); Regis Luther, Naperville, IL (US); Theodore R. Henson, Rochester Hills, MI (US); Michael D. Yan, Ann Arbor, MI (US)

(73) Assignee: AM GENERAL LLC, South Bend, IN (US)

( * ) Notice: Subject to any disclaimer, the term of this patent is extended or adjusted under 35 U.S.C. 154(b) by 460 days.

(21) Appl. No.: 17/161,346

(22) Filed: Jan. 28, 2021

(65) Prior Publication Data

US 2021/0231411 A1 Jul. 29, 2021

Related U.S. Application Data

(60) Provisional application No. 62/967,458, filed on Jan. 29, 2020.

(51) Int. Cl.
  *B62D 21/02* (2006.01)
  *B62D 25/20* (2006.01)
  *F41H 7/04* (2006.01)

(52) U.S. Cl.
  CPC ............ *F41H 7/042* (2013.01); *B62D 21/02* (2013.01); *B62D 25/2036* (2013.01); *B62D 25/2072* (2013.01); *F41H 7/044* (2013.01)

(58) Field of Classification Search
  CPC ......... F41H 7/042; F41H 7/044; B62D 21/02; B62D 25/2036; B62D 25/2072

USPC .......... 296/193.07, 187.07, 187.03; 89/36.08
  See application file for complete search history.

(56) References Cited

U.S. PATENT DOCUMENTS

| 4,323,000 | A  | 4/1982  | Dennis et al.      |
|-----------|----|---------|--------------------|
| 6,658,984 | B2 | 12/2003 | Zonak              |
| 7,255,034 | B2 | 8/2007  | Strassguertl et al.|
| 7,331,270 | B2 | 2/2008  | Booher             |
| 7,685,924 | B2 | 3/2010  | Barbe et al.       |

(Continued)

FOREIGN PATENT DOCUMENTS

| DE | 19928370 A1 | 1/2001 |
| EP | 1574812 A1  | 9/2005 |

(Continued)

OTHER PUBLICATIONS

International Search Report and Written Opinion issued in International Patent Application No. PCT/US2021/015507 dated Nov. 9, 2021 (10 pages).

*Primary Examiner* — Gregory A Blankenship
(74) *Attorney, Agent, or Firm* — Dorsey & Whitney LLP

(57) ABSTRACT

An exterior shell for an armored cab having a longitudinal axis and a transverse axis is provided. The exterior shell has a right side panel extending parallel to the longitudinal axis, a left side panel extending parallel to the longitudinal axis, and a rear panel extending parallel to the transverse axis. A cab lower surface extends between the right side panel and the left side panel. The cab lower surface has a center tunnel extending along the longitudinal axis with an exterior curvature having a variable radius as the center tunnel extends along the transverse axis of the exterior shell. The center tunnel is configured to act as a pressure vessel in the event of an explosion beneath the armored cab.

19 Claims, 16 Drawing Sheets

(56) References Cited

U.S. PATENT DOCUMENTS

| | | | |
|---|---|---|---|
| 7,712,823 B2 | 5/2010 | Greuter et al. | |
| 7,770,506 B2 | 8/2010 | Johnson et al. | |
| 8,033,208 B2 | 10/2011 | Joynt et al. | |
| 8,096,225 B1 * | 1/2012 | Johnson | F41H 7/044 |
| | | | 89/36.02 |
| 8,336,440 B2 | 12/2012 | Mills et al. | |
| 8,376,452 B2 | 2/2013 | Klasfauseweh et al. | |
| 8,499,677 B2 | 8/2013 | Lee | |
| 8,616,617 B2 | 12/2013 | Sherbeck et al. | |
| 8,640,595 B2 * | 2/2014 | Henker | F41H 7/044 |
| | | | 89/36.02 |
| 8,662,227 B2 | 3/2014 | Halliday | |
| 8,733,226 B2 | 5/2014 | Johnson et al. | |
| 8,770,086 B2 | 7/2014 | Enck | |
| 8,776,663 B1 | 7/2014 | Berman | |
| 8,783,157 B2 | 7/2014 | Pavon | |
| 8,943,946 B1 * | 2/2015 | Richmond | B62D 21/15 |
| | | | 89/36.02 |
| 8,955,859 B1 | 2/2015 | Richmond et al. | |
| 9,027,458 B2 | 5/2015 | Akavuti et al. | |
| 9,163,910 B2 * | 10/2015 | Harmon | F41H 7/042 |
| D776,003 S * | 1/2017 | Lee | D12/12 |
| 10,323,909 B2 | 6/2019 | Carton et al. | |
| 2006/0201319 A1 | 9/2006 | De Wet | |
| 2011/0314999 A1 * | 12/2011 | Luther | F41H 7/042 |
| | | | 89/36.02 |
| 2012/0186428 A1 | 7/2012 | Peer et al. | |
| 2013/0205984 A1 * | 8/2013 | Henker | F41H 7/042 |
| | | | 89/36.08 |
| 2013/0241237 A1 | 9/2013 | Griese et al. | |
| 2013/0249244 A1 * | 9/2013 | Cassaday | B62D 25/2036 |
| | | | 296/187.03 |
| 2014/0060304 A1 * | 3/2014 | Harmon | F41H 7/044 |
| | | | 89/36.02 |
| 2014/0150633 A1 * | 6/2014 | Mears | F41H 7/042 |
| | | | 89/36.02 |
| 2017/0052002 A9 | 2/2017 | Berman | |
| 2018/0058820 A1 | 3/2018 | Kwiatkowski et al. | |

FOREIGN PATENT DOCUMENTS

| | | |
|---|---|---|
| EP | 2327950 A2 | 6/2011 |
| EP | 2304381 B1 | 11/2014 |
| GB | 2481489 A | 12/2011 |
| GB | 2500805 B | 5/2014 |
| WO | 2009102364 A2 | 8/2009 |
| WO | 2015052464 A1 | 4/2015 |
| WO | 2018065791 A1 | 4/2018 |

* cited by examiner

ARMORED CAB FOR BLAST PROTECTION

CROSS-REFERENCE TO RELATED APPLICATIONS

The present disclosure claims priority to U.S. provisional application No. 62/967,458 entitled "Armored Cab for Blast Protection," filed Jan. 29, 2020, which is hereby incorporated by reference herein in its entirety.

BACKGROUND

Military operations frequently include travel by vehicle in areas where ground explosions are common. Current armored vehicles may be optimized for conditions other than ground explosions, resulting in injuries to personnel traveling in armored vehicles. Specifically, some armored vehicles include lower portions that deform, rupture, or otherwise fail in the event of a ground explosion.

SUMMARY

An example armored cab has a longitudinal axis and a transverse axis and includes a right side frame extending parallel to the longitudinal axis and a left side frame extending parallel to the longitudinal axis. A cab lower surface extends from the right side frame to the left side frame and includes a center tunnel. The center tunnel has a center tunnel right edge coupled to a first outer portion. The center tunnel has an exterior curvature with a variable radius extending upward along the transverse axis of the armored cab from center tunnel right edge to a center tunnel upper boundary and downward from the center tunnel upper boundary to a center tunnel left edge. The center tunnel left edge is coupled to a second outer portion. The first outer portion and the second outer portion each have a convex exterior curvature along the transverse axis of the armored cab.

A cab lower surface for an armored cab includes a right hull having a right hull peripheral edge configured to couple to a right side frame of the armored cab, a right hull interior edge, and a right hull lower boundary located between the right hull peripheral edge and the right hull interior edge. A center tunnel extends from the right hull interior edge and has an elliptical exterior curvature. A left hull extends from the center tunnel and has a left hull interior edge coupled to the center tunnel, a left hull peripheral edge configured to couple to a left side frame of the armored cab, and a left hull lower boundary located between the left hull interior edge and the left hull peripheral edge. A right interior floor extends from the right hull peripheral edge to the right hull interior edge and is spaced above the right hull lower boundary. A left interior floor extends from the left hull peripheral edge to the left hull interior edge and is spaced above the left hull lower boundary.

An exterior shell for an armored can has a longitudinal axis and a transverse axis and includes a right side panel extending parallel to the longitudinal axis, a left side panel extending parallel to the longitudinal axis, and a rear panel extending parallel to the transverse axis. A cab lower surface extends between the right side panel and the left side panel and includes a center tunnel extending along the longitudinal axis. The center tunnel has an exterior curvature with a variable radius as the center tunnel extends along the transverse axis of the exterior shell. The center tunnel is configured to act as a pressure vessel in the event of an explosion beneath the armored cab.

In addition to the exemplary aspects and embodiments described above, further aspects and embodiments will become apparent by reference to the drawings and by study of the following description.

DETAILED DESCRIPTION

The present disclosure relates generally to an armored cab configured for mounting to a vehicle chassis to form a blast protected vehicle. The armored cab includes a cab lower surface shaped to reduce the effect of an explosion under the vehicle in a passenger portion of the armored cab, helping to reduce injuries to occupants of the armored cab. Specifically, the structure of the cab lower surface helps to reduce injuries to the occupants of the armored cab, making the vehicle with the armored cab especially effective for the military, private security, and other passengers in areas where ground explosions are common.

Generally, the cab lower surface may be formed as part of an armored cab constructed to integrate with the cab lower surface or may be integrated into a pre-existing armored vehicle or stock vehicle. Exterior curvature of the cab lower surface is designed so that the cab lower surface acts as a pressure vessel in the event of an explosion beneath the armored cab. Specifically, the thickness, radius, and other parameters of at least a portion of the cab lower surface are selected so that the cab lower surface can withstand pressure generated by an explosion beneath the vehicle without rupturing and with reduced deformation in the passenger portion of the armored cab. For example, the bottom surface may have an undulating shape, with smooth transitions between sections to reduce pressure points and localized areas of weakness. In one embodiment, the bottom surface includes an elliptically shaped central region that extends along the center area along a longitudinal length of the cab. Extending from or connected to both lateral edges of the central region are hulls or wings that have a curvature generally extending in the opposite direction from that of the central region. For example, the central region may have a general curvature extending upwards towards the cab and the two wings may have a general curvature extending in the opposite direction, i.e., towards a ground surface and away from the cab.

Figure 1:
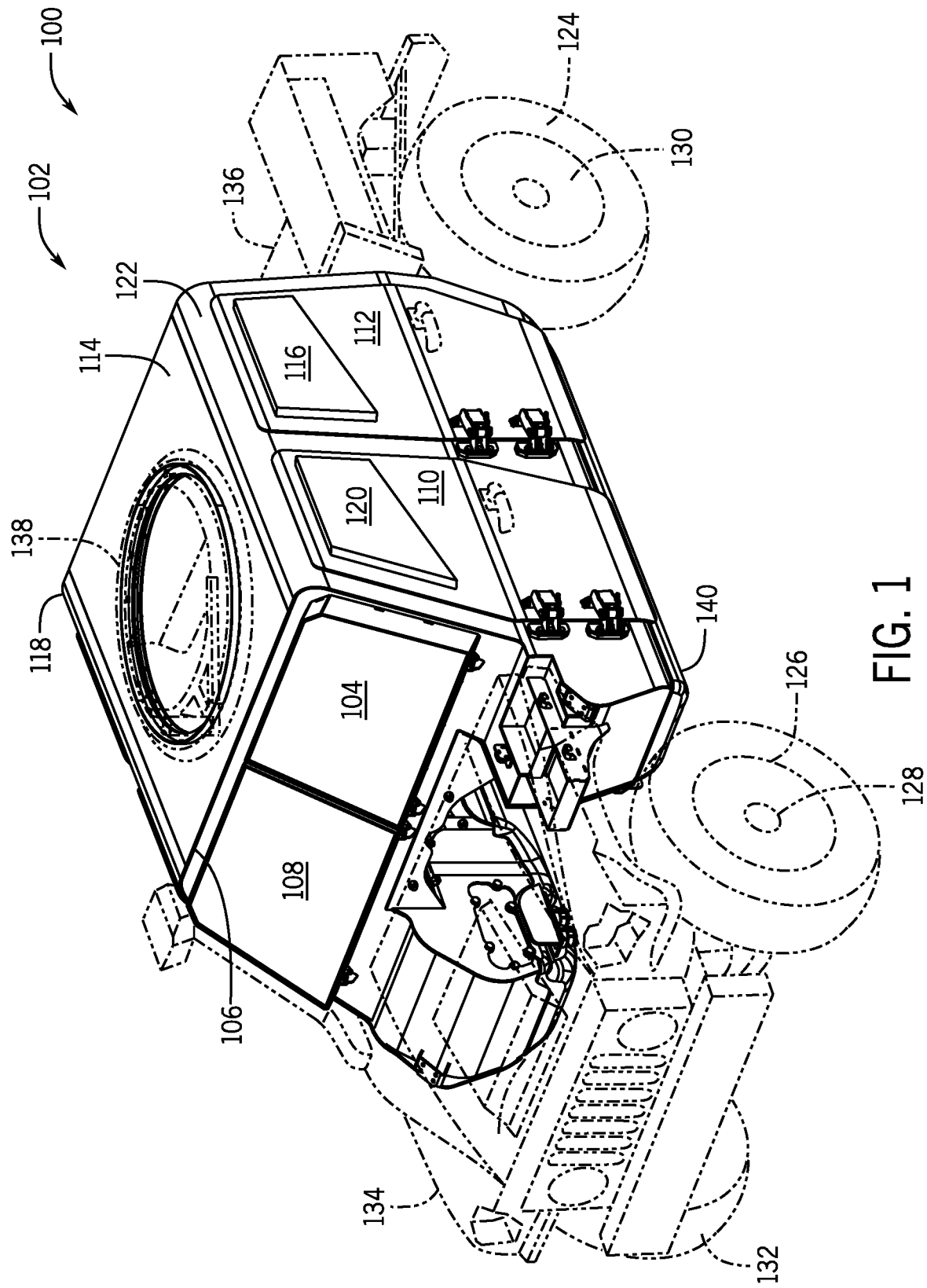
FIG. 1 illustrates a perspective view of an armored cab mounted on a vehicle chassis to form a vehicle with an armored cab.

Turning to the figures, FIG. 1 shows an armored cab 102 mounted on a chassis to form an armored vehicle 100. As shown, the armored cab 102 may be mounted on a chassis connected to wheels (e.g., wheels 128 and 130), tires (e.g., tires 132, 126, and 124) and other vehicle structures including, for example, an engine, drive train, axles, fuel tank, etc. As shown, additional elements, such as hood 134 and bed 136 may be added to the armored vehicle 100 along with the armored cab 102. The armored cab 102 generally includes a cab lower surface 140, roof panel 114, right side frame 118, left side frame 122, and windshield panel 106. Other elements may be added to the armored cab 102, such as right windshield 108, left windshield 104, door 110, door window 120, door 112, and door window 116. As discussed above, the armored cab 102 may be constructed to integrate with the cab lower surface 140 or may be a stock armored cab retrofitted with the cab lower surface 140, e.g. by adhering or fixing the cab lower surface 140 to an existing cab to replace a lower surface of the existing cab.

Figure 8:
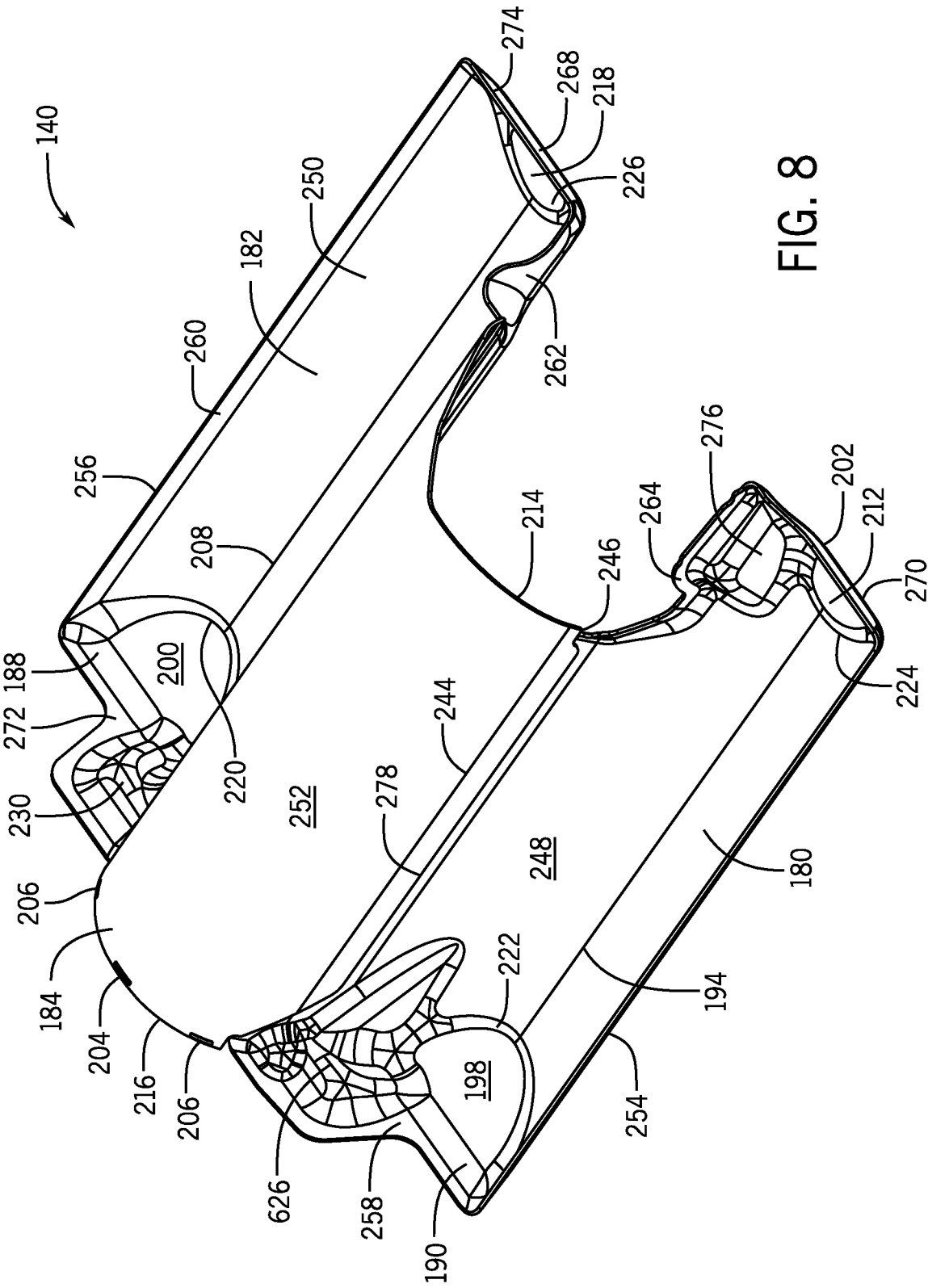
FIG. 8 illustrates a perspective view of a cab lower surface.
Figure 9:
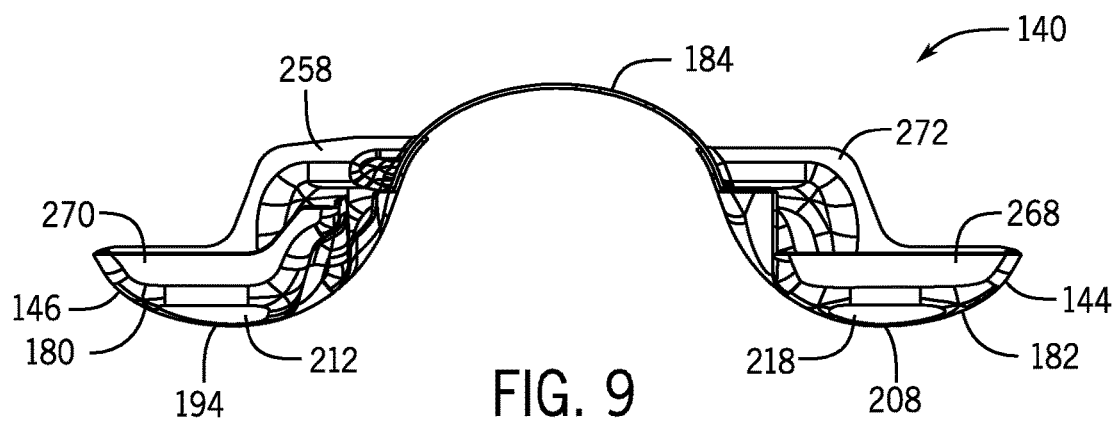
FIG. 9 illustrates a front plan view of a cab lower surface.
Figure 10:
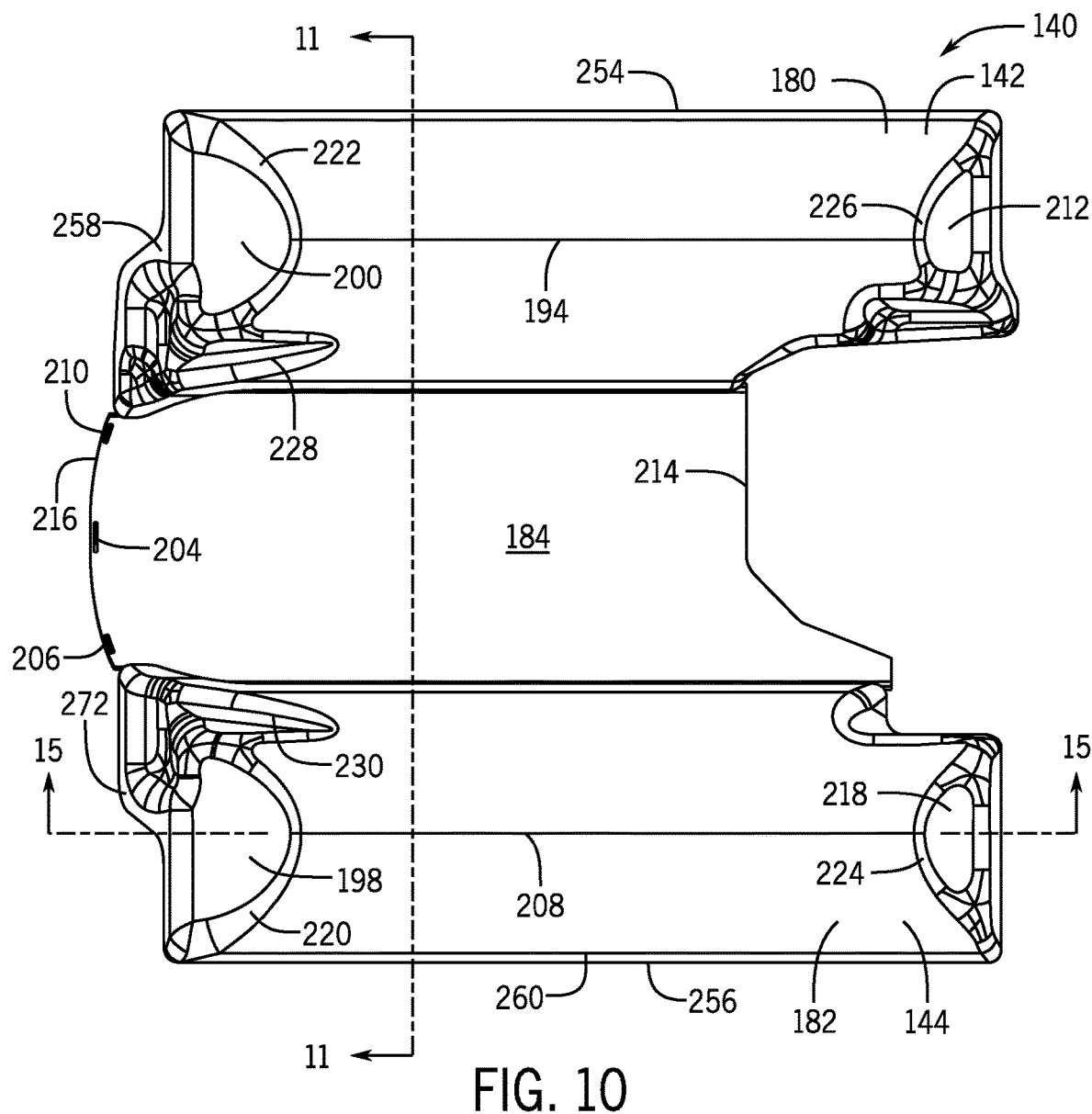
FIG. 10 illustrates a bottom plan view of a cab lower surface.

As shown in FIG. 8, the cab lower surface 140 generally includes a center tunnel, a first outer or edge portion (e.g., first or right wing), and a second outer or edge portion (e.g., second or right wing). In some implementations the cab lower surface 140 also includes a first interior floor and a second interior floor to define a cabin of the armored cab 102. Each component of the cab lower surface 140 is discussed in more detail below.

Figure 12:
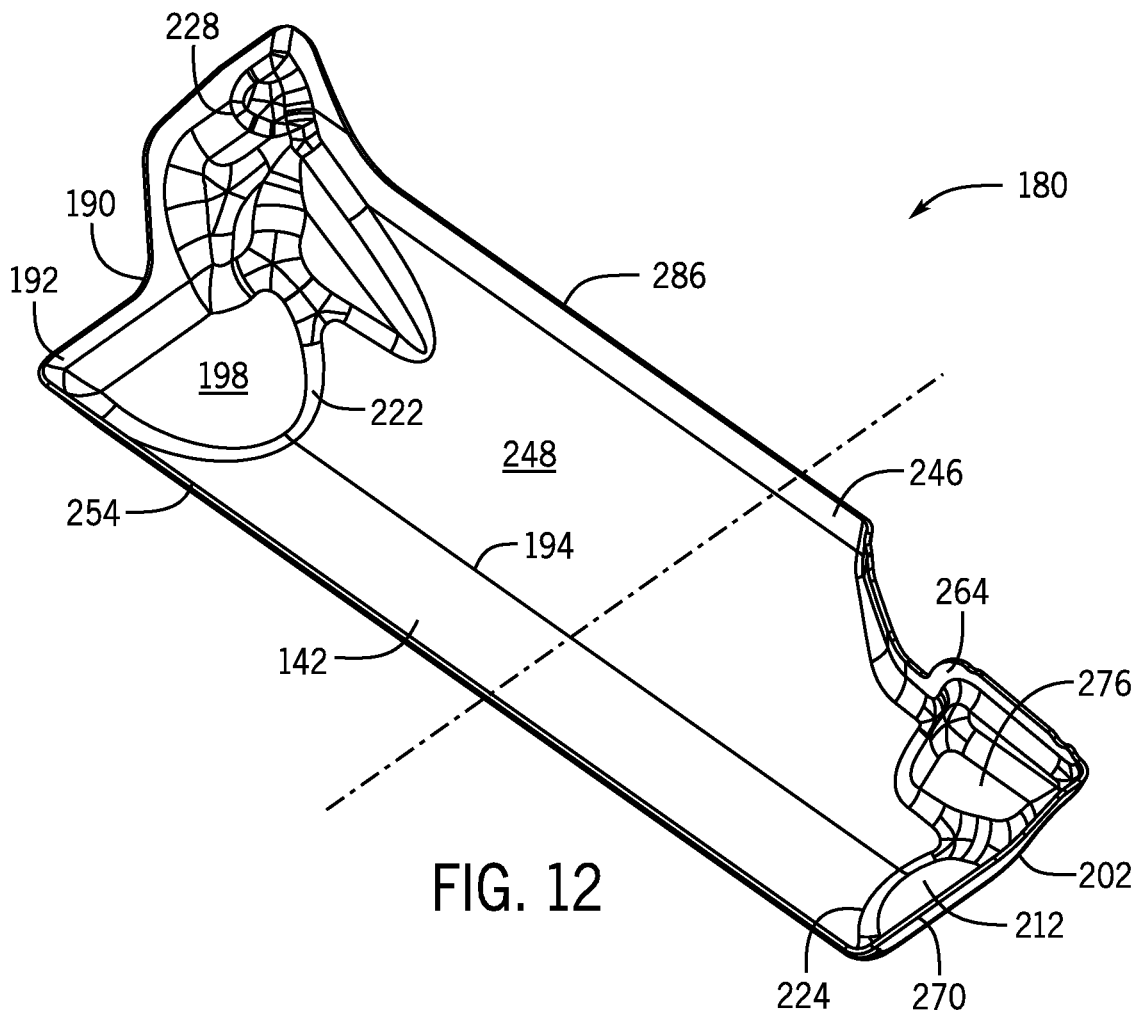
FIG. 12 illustrates a perspective view of a first outer portion of a cab lower surface.

The first outer portion 180 defines a first side of the cab floor 140. As shown in FIG. 12, the first outer portion 180 may define a right hull 142 extending horizontally from a right hull peripheral edge 254 to a right hull interior edge 286. The right hull 142 is generally formed of a sheet of material (e.g., steel, aluminum, or other metal) with a right hull interior surface 248 and an exterior surface 249. The sheet of material forming the right hull 142 may be a single material or may be stacked layers of different or the same material (e.g., a layer of composite stacked between an exterior layer of steel and an interior layer of steel). In one embodiment, the right hull 142 is formed of a sheet of steel with a generally uniform thickness in the shape of the right hull 142. In other implementations, the sheet of material forming the right hull 142 may have areas of varying thickness. A single sheet of steel is generally strong and provides good resistance to impact. Further, rolling out or otherwise forming a single sheet of steel or other material can be simpler than manufacturing two metal layers and a composite layer with the same or similar curvature. A layered structure is lighter than a solid layer of steel and, accordingly, may be easier to transport and use on a vehicle. Other methods of forming the right hull 142 may be used for various materials.

Generally, the right hull 142 is curved between the right hull peripheral edge 254 and the right hull lower boundary 194 and the right hull lower boundary 194 and the right hull interior edge 286 along a transverse axis of the first outer portion 180. The curvature of the right hull 142 is generally convex as viewed from the exterior of the cab. As shown in FIG. 12, the exterior curvature along the transverse axis between the right hull peripheral edge 254 and the right hull interior edge 286 may vary along a longitudinal axis of the right hull 142. For example, as shown in FIG. 12, the right hull lower boundary 194 extends along a portion of the longitudinal axis of the right hull 142.

The exterior curvature of the right hull 142 generally extends downward as the first outer portion 180 extends from the right hull peripheral edge 254 to the right hull lower boundary 194 along the transverse axis. The exterior curvature of the right hull 142 generally extends upward as the first outer portion 180 extends from the right hull lower boundary 194 to the right hull interior edge 286. The right hull lower boundary 194 is generally the lowest point (i.e., closest to the ground) of the exterior surface of the right hull 142 when the right hull 142 is oriented such that the right hull interior surface 248 is facing upward towards the top of the cab.

Figure 11:
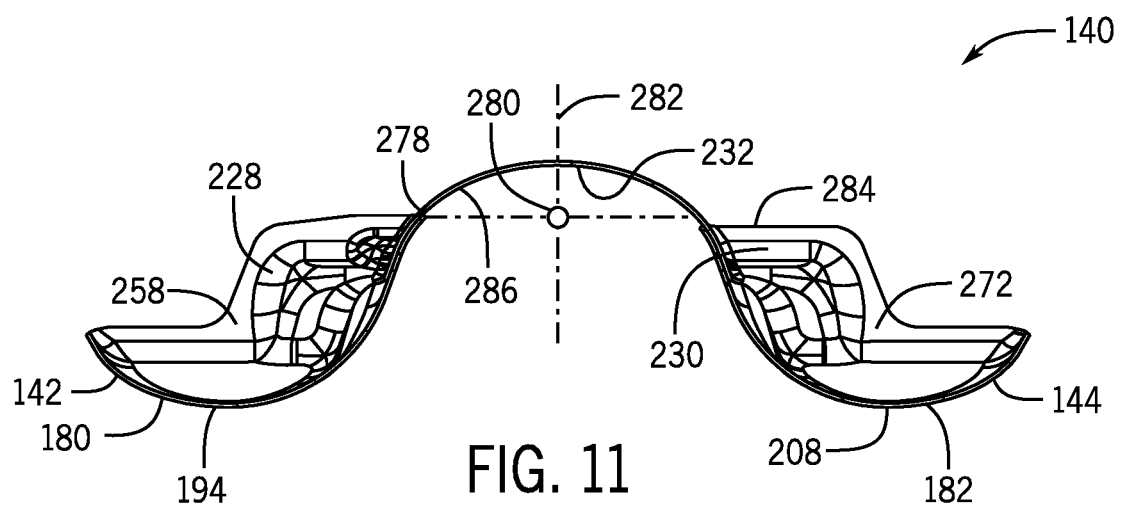
FIG. 11 illustrates a section view of a cab lower surface, taken along section line 11-11 of FIG. 10.

The exterior curvature of the right hull 142 between the right hull peripheral edge 254 and the right hull interior edge 286 may be any smooth curve where the right hull lower boundary 194 is the lowest point on the exterior surface of the right hull 142. For example, the exterior curvature of the first outer portion 180 may form a parabola, a portion of a circle, an ellipse, or another conical or spherical curve. The exterior curvature may, in some implementations, be an elliptical curvature, such that a cross-section of the right hull 142 forms a portion of an ellipse. In some implementations, the exterior curvature may be a combination of constant radii and varying radii. The exterior curvature may also deviate from conical and spherical curves by, for example, having an irregularly varying radius or being formed from several portions of differing curves. The exterior curvature may have a consistent concavity or may have one or more inflection points. For example, as shown in FIG. 11, the exterior curvature between the right hull lower boundary 194 and the right hull interior edge 286 includes an inflection point such that the exterior curvature changes from upwardly concave to upwardly convex as the right hull 142 extends from the right hull lower boundary 194 towards the right hull interior edge 286.

In some implementations, such as the right hull 142 shown in FIG. 12, the right hull lower boundary 194 terminates and a transition plane 198 extends between the right hull lower boundary 194 and a right hull rear plane 190. The right hull rear plane 190 may be formed at a variety of angles with respect to the transition plane 198 to facilitate connection to a rear panel of an armored cab (e.g., the rear panel 164). The transition plane 198 is generally connected to the right hull rear plane 190 and the right hull interior surface 248 by one or more fillets, such as fillet 222. A similar transition plane 212 extends between the right hull interior surface 248 and the right hull front panel connection area 270 and is connected to the right hull interior surface 248 by a fillet 224. The fillets 222 and 224 provide rounded edges between the right hull interior surface 248 and adjoining surfaces, reducing stress concentrations in the right hull 142 relative to planes meeting at a sharp edge.

The right hull 142 may include curvature and other surface variation to accommodate mounting the armored cab 102 onto a vehicle. For example, chassis curvature 228 and chassis curvature 276 provide room for elements of the vehicle such as the axles and wheels. As shown, the right hull 142 may have irregularly shaped edges, such as the right hull rear edge 192 and the right hull interior edge 286. Like the chassis curvature 276, irregular edges may be formed to accommodate different portions of a vehicle or other components of the armored cab 102. However, generally the variation will be selected to have smooth transitions, such as curved surfaces, rather than sharp angles to reduce stress concentrations.

In other implementations, the first outer portion 180 may be a structure other than the right hull 142. For example, the first outer portion 180 may be a single sheet of material shaped with a convex exterior curvature. In these implementations, front, rear, and side panels of the armored cab 102 may be shaped to provide side structure where the first outer portion 180 does not include, for example a right hull front plane 202 or a right hull rear plane 190.

Figure 13:
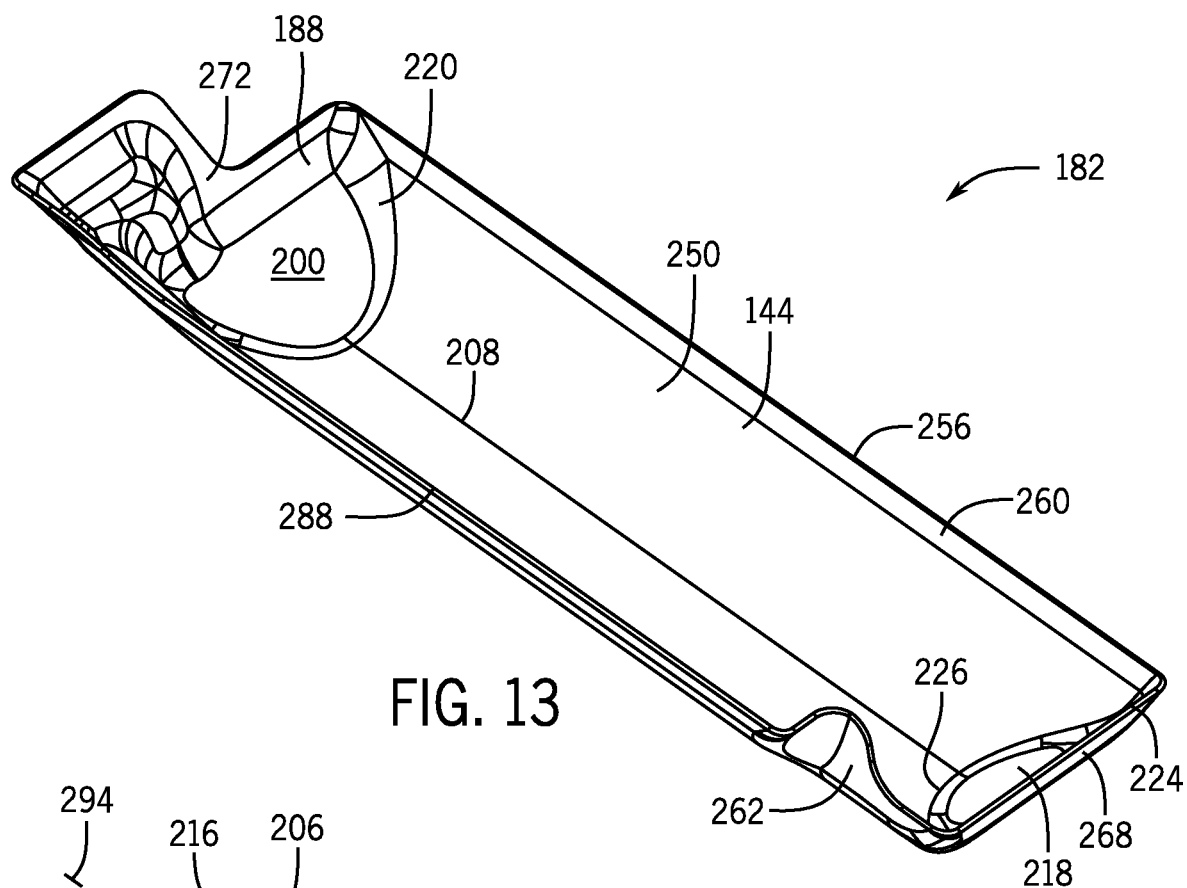
FIG. 13 illustrates a perspective view of a second outer portion of a cab lower surface.

As shown in FIG. 13, the second outer portion 182 may, in one implementation, be a left hull 144. The left hull 144 is generally substantially similar to the right hull 142 in mirror image. For example, the left hull 144 has a generally convex curvature with respect to the exterior of the cab and a lower boundary 208 forming the lowest portion of the left hull 144. The convex curvature may, in some implementations, be an elliptical curvature, such that a cross-section of the left hull 144 forms a portion of an ellipse. In some implementations, the convex curvature may be a combination of constant radii and varying radii. The left hull 144 also includes transition planes 220 and 224 joined to the remainder of the hull 144 by fillets 220 and 224 to reduce stress concentrations in the hull 144. Some minor portions of the left hull 144 may vary from the right hull 142. For example, as shown in FIG. 8, the left hull 144 may include chassis curvature that varies from chassis curvature 276 of the right hull 142 due to characteristics of the chassis. Like the first outer portion 180, the second outer portion 182 may be, in some implementations, a structure other than the hull 144.

Figure 6:
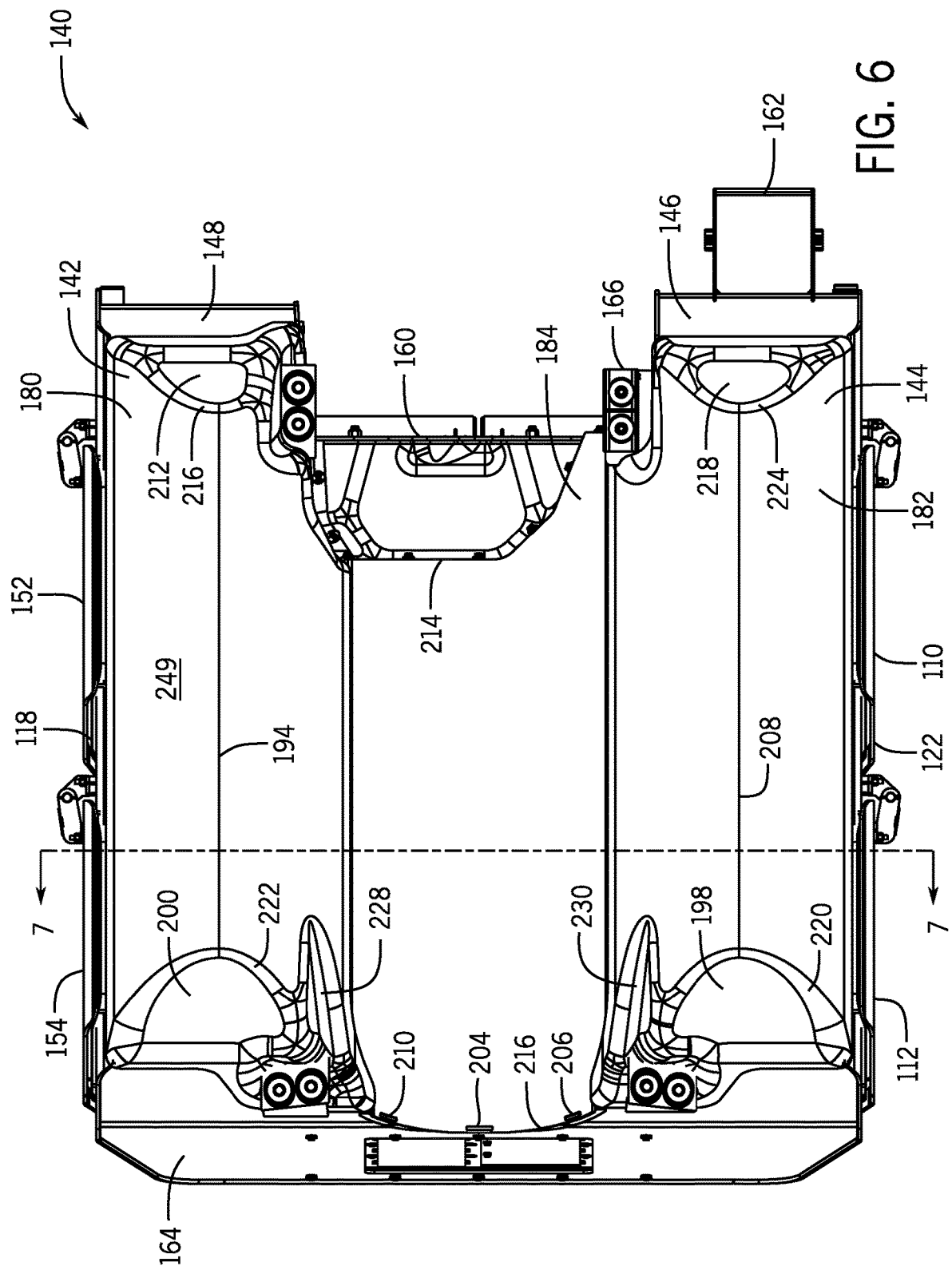
FIG. 6 illustrates a bottom plan view of an armored cab.
Figure 14:
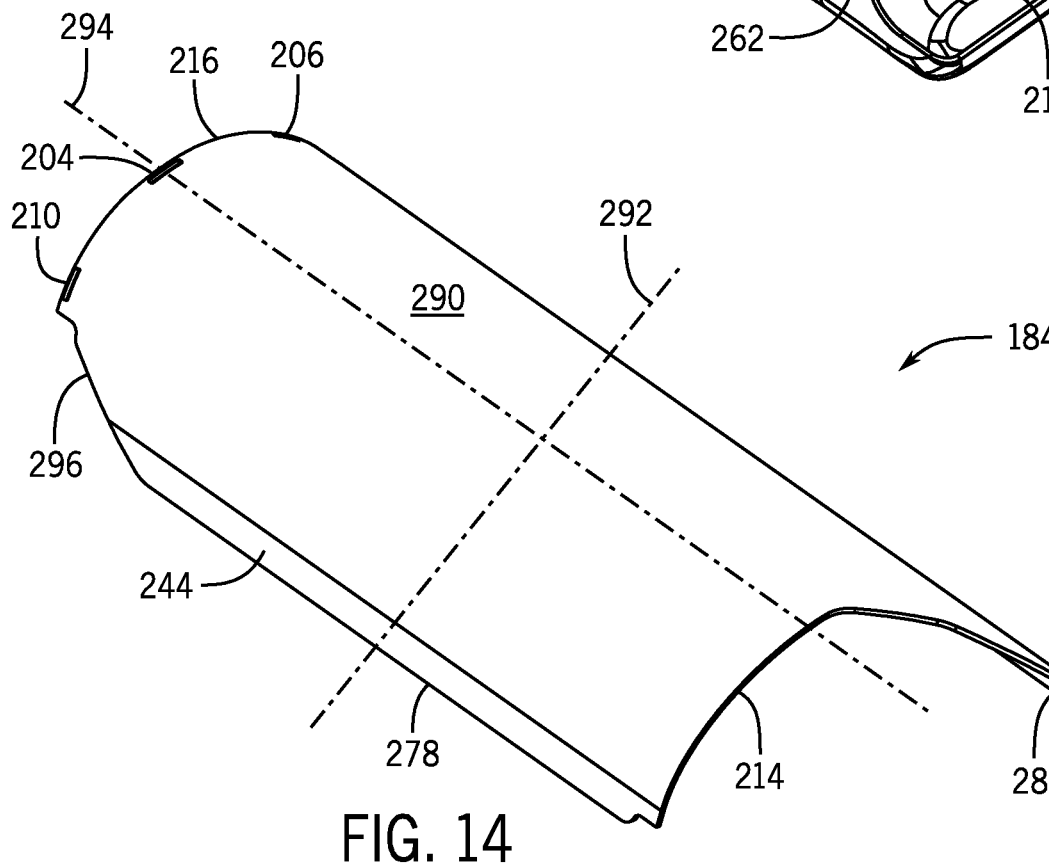
FIG. 14 illustrates a perspective view of a center tunnel of a cab lower surface.

The center tunnel 184 defines the central longitudinal portion of the cab lower portion 140, as shown in FIG. 6. With reference to FIG. 14, the center tunnel 184 extends from a center tunnel right edge 278 to a center tunnel left edge 284 along a transverse axis 292 and extends from a center tunnel front edge 214 to a center tunnel rear edge 216 along a longitudinal axis 294. The center tunnel 184 may be formed from a single sheet of material manufactured (e.g., rolled) to form the shape of the center tunnel 184. In other implementations, the center tunnel 184 may be formed from several materials, such as by a layered sheet including a composite material layered between steel sheets. A layered sheet including a composite material between two sheets is lighter per volume than a single steel sheet. A single steel sheet is simpler to manufacture into the shape of the center tunnel 184.

The center tunnel 184 may be formed from a rectangular sheet of material, shaped to form a tunnel structure. In some implementations, the tunnel 184 may define irregular boundaries to, for example, accommodate for the overall structure of an armored cab (e.g., the armored cab 102). For example, as shown in FIG. 14, the center tunnel front edge 214 has an irregular shape, curving gradually closer to the rear edge 216 of the tunnel as the tunnel extends towards the longitudinal axis 294 from the left edge 284 and continues roughly parallel to the transverse axis 292 until meeting the right edge 278. Similarly, a connecting edge 296 connects the center tunnel right edge 278 to the center tunnel rear edge 216 instead of the center tunnel right edge 278 connecting directly to the center tunnel rear edge 216 at a corner. The connecting edge 296 meets the center tunnel right edge 278 and the center tunnel rear edge 216 at approximately a 45° angle, and extends between the right edge 278 and the rear edge in a straight line.

Generally, the center tunnel 184 has an exterior curvature along the transverse axis 292 as the center tunnel 184 extends between the center tunnel right edge 278 and the center tunnel left edge 284. The exterior curvature of the center tunnel 184 is generally concave such that when the center tunnel 184 is mounted as part of a cab lower surface as shown, for example, in FIG. 11, the center tunnel upper boundary 232 is located at a height above the center tunnel right edge 278 and the center tunnel left edge 284. The exterior curvature may be defined by a variety of geometric shapes and curves, as described further below.

The exterior curvature of the center tunnel 184 generally has a variable radius such that the different points on the exterior surface 286 of the center tunnel 184 are different distances from a fixed point along the longitudinal axis 294 of the center tunnel 184. For example, as shown in FIG. 11, a center point 280 of the exterior curvature of the center tunnel 184 is generally located along a center axis 282 of the center tunnel 184, where the center axis 282 intersects the center tunnel upper boundary 232. The radius of the exterior curvature of the center tunnel 184 may be defined as a distance between the center point 280 and a center tunnel exterior surface 286. As shown in FIG. 11, the radius varies at different points along the center tunnel exterior surface 286. For example, the radius has a longer length at the center tunnel right edge 278 and center tunnel left edge 284 than the radius at the center tunnel upper boundary 232. In the example shown in FIG. 11, the radius is largest at the center tunnel right edge 278 and the center tunnel left edge 284 and shortest at the center tunnel upper boundary 232 but in other implementations, the radius may be largest at a different point of the center tunnel exterior surface 286.

In an exemplary implementation, the exterior curvature of the center tunnel 184 is an elliptical exterior curvature, such that the center tunnel exterior surface 286 forms a portion of an elliptical cylinder (a cylinder having a cross section that is an ellipse). The elliptical exterior curvature may include any portion of an elliptical cylinder. In the example shown in FIG. 11, the elliptical exterior curvature forms substantially half of an elliptical cylinder such that the center point 280 of the elliptical exterior curvature of the center tunnel 184 is substantially aligned with the center tunnel right edge 278 and the center tunnel left edge 284. In other words, the center point 280 of the elliptical exterior curvature, the center tunnel right edge 278, and the center tunnel left edge 384 are an equal height above a lowest point of the cab. In other implementations, the center point 280 may be situated above or below the center tunnel right edge 278 and the center tunnel left edge 284. When the center point 280 is located above the center tunnel right edge 278 and the center tunnel left edge 284 the center tunnel 184 is formed from more than half of an elliptical cylinder and when the center point 280 is located below the center tunnel right edge 278 and the center tunnel left edge 284 the center tunnel 184 is formed from less than half of an elliptical cylinder. When the exterior curvature is formed from more than half of an elliptical cylinder, the curvature will generally be steeper with the upper boundary 232 extending farther into the cab and being farther from the ground relative to half of an elliptical cylinder. Conversely, when the exterior curvature is formed from less than half of an elliptical cylinder, the curvature will be shallower and the upper boundary 232 will be closer to the ground relative to half of an elliptical cylinder.

In some implementations, the exterior curvature may exclude portions of the center tunnel 184, such as a hull connection area 244 on the center tunnel 184 shown in FIG. 14. The hull connection area 244 is a small portion of the center tunnel 184 relative to the surface area of the center tunnel 184 proximate to the center tunnel right edge 278. Another hull connection area may be located proximate to the center tunnel left edge 284. The hull connection area 244 may be substantially planar to facilitate connection between the center tunnel 184 and adjacent components, such that the exterior curvature of the center tunnel 184 extends between the hull connection area 244 proximate to the center tunnel right edge 278 and the hull connection area located proximate the center tunnel left edge 284. The hull connection areas provide overlapping surface area to attach the center tunnel 184 to outer portions of the cab lower portion using welding, fasteners, or other attachment mechanisms.

Generally, the exterior curvature of the center tunnel 184 along the transverse axis 292 between the center tunnel right edge 278 and the center tunnel left edge 284 is constant as the center tunnel 184 extends along the longitudinal axis 294. For example, as shown in FIG. 14, the elliptical exterior curvature of the center tunnel 184 follows the same curvature from the center tunnel front edge 214 to the center tunnel rear edge 216 such that the center tunnel 184 has the same cross-section at different points along the longitudinal axis 294. In some implementations, however, the exterior curvature of the center tunnel 184 may vary along the longitudinal axis 294 of the center tunnel 184 by, for example, tapering a width of the center tunnel 184 such that the center tunnel right edge 278 and the center tunnel left edge 284 are closer at the center tunnel rear edge 216 and farther apart at the center tunnel front edge 214.

In some implementations, the center tunnel 184 may include connecting structures, such as the connection slots 204, 206, and 210. The connection slots 204, 206, and 210 extend from the center tunnel interior surface 290 through to the center tunnel exterior surface 286 near the center tunnel rear edge 216 to facilitate connection of the center tunnel 184 to other components of the armored cab 102. In some implementations, additional connecting structures may be located near the center tunnel front edge 214, center tunnel left edge 284, or center tunnel right edge 278.

Figure 16:
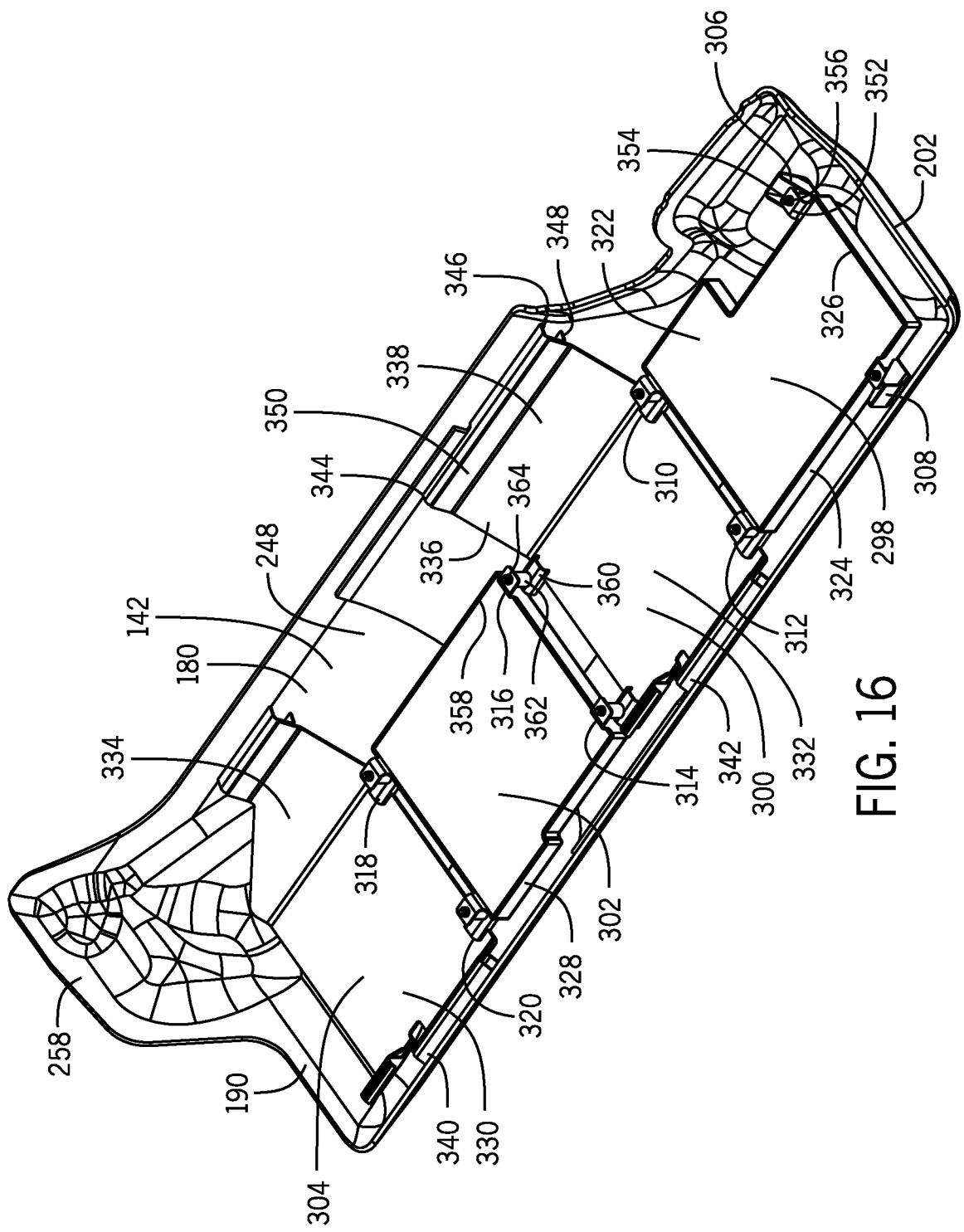
FIG. 16 illustrates a first interior floor mounted within a first outer portion of a cab lower surface.
Figure 17:
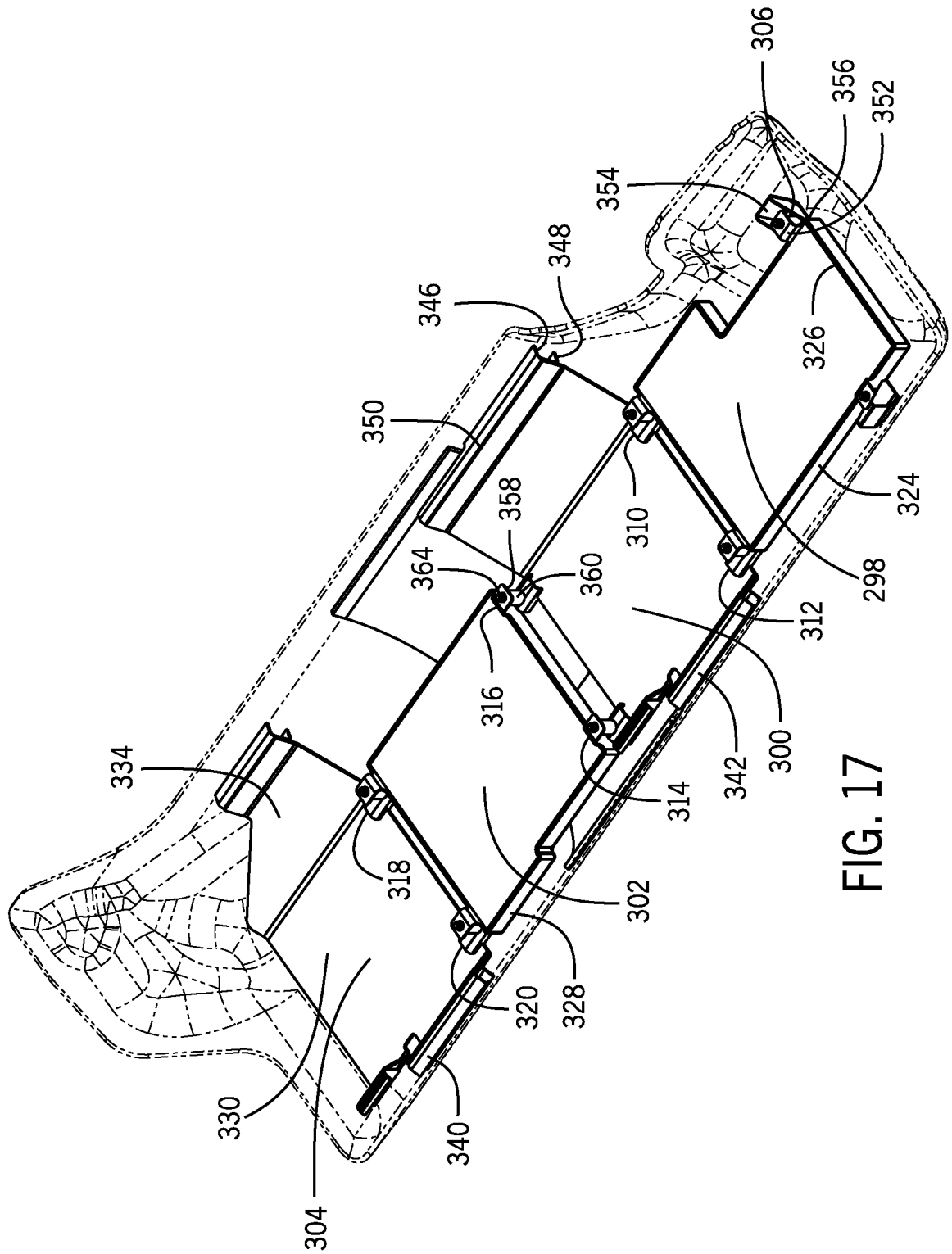
FIG. 17 illustrates an interior floor.

FIG. 16 and FIG. 17 illustrate an interior floor 242 inside of a first outer portion 180 (shown as a right hull 142.) The interior floor 242 is composed of floor panels and floor mounting structures that connect together to mount the floor panels within an outer portion to form the bottom of the passenger portion of the armored cab. The interior floor 242 may include any number and configuration of floor panels and floor mounting structures. For example, one interior floor 242 may include one floor panel extending from the right hull front plane 202 to the right hull rear plane 190 and including four floor mounting structures. Other implementations of the interior floor 242 may include any number of floor panels and floor mounting structures. The floor panels may be shaped the same or the shapes of floor panels may vary, though the floor panels generally include a planar portion without curvature. Further, floor mounting structures may serve to mount the floor panels to the first outer portion 180 or to connect floor panels to each other. The number and configuration of floor panels is dependent on factors such as the shape of the cab, the desired dimensions of the interior cabin, and structures that may eventually be attached to the interior floor.

The floor panels of the interior floor 242 may be made from a variety of materials such as steel, aluminum, or a composite material. In some implementations, the floor panels may be made from several layers of material (e.g., a layer of composite material sandwiched between layers of steel). Further, floor panels may be solid panels (formed from continuous material) or hollow panels (with open space between, for example, a top material and a bottom material). In the exemplary interior floor 242 shown in FIG. 16 and FIG. 17, the interior floor 242 includes four floor panels—a center floor panel 298, a side braced floor panel 300, a center floor panel 302, and a side braced floor panel 304. As shown in FIG. 16, the side braced floor panel 304 and the side braced floor panel 300 are solid panels and the center floor panel 302 and the center floor panel 298 are hollow panels.

Center floor panel 298 and center floor panel 302 are center floor panels that are generally made of planar materials to define a flat resting surface for the passengers. For example, center floor panel 298 includes a center panel top surface 322 connected to a center panel lower surface (not shown) by center panel side surfaces (e.g., center panel side surface 324 and center panel side surface 326.) The center panel top surface 322 and the center panel lower surface are each substantially planar surfaces. In some implementations, the center panel side surfaces may be sized so that the center panel top surface 322 and the center panel lower surface are spaced apart from each other, creating in open space in the interior of the center floor panel 298. The open space may be left open (e.g., filled by air) or may be filled with another material (e.g., insulation or impact resistant composite.) In other implementations, the center panel top surface 322 and the center panel lower surface are a top surface and a bottom surface of the same piece of material.

The center floor panel 298 and the center floor panel 302 are generally rectangular, with variations from a rectangular shape to accommodate a shape of the first outer portion 180. For example, the center panel side surface 328 is formed of several planes to accommodate the shape of the first outer portion 180 while increasing floor area created by the center floor panel 302. Center panels may be a variety of shapes dependent on design considerations and a shape of the first outer portion 180.

The side braced floor panel 300 and side braced floor panel 304 are side braced floor panels generally including a panel planar portion (e.g., a panel planar portions 330 and 332) and one or more side bracing portions (e.g., side bracing portions 334, 336, 338, and 340.) Using side braced floor panel 300 as an example, the panel planar portion 332 is generally rectangular. The bracing connection portion 338 and the side bracing portion 342 extend from the panel planar portion 332 and, as shown in FIG. 16, may include a bracing structure 344 with bracing arms 346 and 348 and a bracing connection portion 338 connecting the bracing structure 344 to the panel planar portion 332. The bracing arm 346 is generally parallel to the bracing arm 348 and the bracing arms 346 and 348 generally extend perpendicular to a bracing structure interior surface 350 of the bracing structure 344. The bracing connection portion 338 may be planar or may be slightly curved.

A side braced floor panel may include one, two, or more side bracing portions. For example, the side braced floor panel 300 includes two side bracing portions 336 and 342. Other side braced floor panels may include a bracing portion on one side of the side braced floor panel and no bracing portion on the opposite side. Some side braced floor panels may include multiple side bracing portions along a single edge of the planar portion to, for example, compensate for curvature of the first outer portion 180. Further, some side bracing portions do not include a bracing structure 344 and instead the side bracing portion is curved to substantially match the curvature of the first outer portion 180.

As shown in FIG. 16, the side braced floor panel 300 and center floor panel 302 are generally comprised of solid panels. However, in some implementations the side braced floor panel 300 and center floor panel 302 may be comprised, partially or fully, of hollow panels. For example, in some implementations to panel planar portion 332 may be a hollow panel and the side bracing portion 336 may be a solid panel.

The interior floor 242 also includes floor mounting structures, such as side mounting structures 306 and 308 and panel mounting structures 310, 312, 314, 316, 318, and 320. The side mounting structure 306 and the side mounting structure 308 connect to the center floor panel 298. The panel mounting structure 310 and panel mounting structure 312 connect the center floor panel 298 to the side braced floor panel 300, the panel mounting structure 316 and the panel mounting structure 314 connect the side braced floor panel 300 to the center floor panel 302, and the panel mounting structure 318 and the panel mounting structure 320 connect the center floor panel 302 to the side braced floor panel 304.

A side mounting structure may include a mounting tab (e.g., mounting tab 352), a mounting bracket (e.g., mounting bracket 354), and a mounting bolt (e.g., bolt 356). The mounting tab 352 may extend from the center panel top surface 322 of the center floor panel 298. In some implementations, the mounting tab 352 is formed continuously with the center panel top surface 322 and in other implementations, the mounting tab 352 is fixedly connected to the center panel top surface 322. The mounting tab 352 may also, in some implementations, extend from a lower surface or side surface of the center floor panel 298. The mounting tab 352 generally includes a through hole or aperture sized for the bolt 356. The mounting bracket 354 generally includes an outer surface configured to be affixed to the first outer portion 180 and a through hole or aperture sized for the bolt 356. The bolt 356 extends through the aperture in the mounting tab 352 and the aperture in the mounting bracket 354 to form the side mounting structure 306.

An example panel mounting structure 316 includes an upper mounting tab 358, a lower mounting tab 360, a spacing cylinder 362, and a bolt 364. The upper mounting tab 358 is similar to the mounting tab 352. The lower mounting tab 360 is similar to the upper mounting tab 358 but extends from (or is fixedly connected to) the panel planar portion 332 of the side braced floor panel 300. The spacing cylinder 362 extends between the upper mounting tab 358 and the lower mounting tab 360 and includes an aperture for receiving the bolt 364. The bolt 364 extends through an opening in the upper mounting tab 358, the aperture in the spacing cylinder 362, and an opening in the lower mounting tab 360 to secure the side braced floor panel 300 to the center floor panel 302.

Turning to the structure of the cab lower surface 140, as shown in FIG. 8, a cab lower surface 140 is generally formed from a center tunnel 184, a first outer portion 180, and a second outer portion 182. The cab lower surface 140 may be integrally formed such that the center tunnel 184, the first outer portion 180 and the second outer portion 182 are formed from one piece of material. For example, a cab lower surface 140 may be formed from a sheet of steel rolled to form the shape of the cab lower surface 140. When the cab lower surface 140 is formed from one sheet of material, the center tunnel right edge 278 and center tunnel left edge 284 are defined by curvature of the cab lower surface 140. For example, at the center tunnel right edge 278 the curvature of the cab lower surface 140 transitions from the first outer portion 180 convex exterior curvature to the elliptical exterior curvature of the center tunnel 184 and at the center tunnel left edge 284 the curvature of the cab lower surface 140 transitions from the elliptical exterior curvature of the center tunnel 184 to the second outer portion 182 convex exterior curvature. An integrally formed cab lower surface 140 is generally stronger than a cab lower surface formed from discrete pieces because there are not weaknesses introduced at connections between separate portions of the cab lower surface 140. However, an integrally formed cab lower surface is more difficult to manufacture.

In other implementations, such as the example cab lower surface 140 shown in FIG. 8, the center tunnel 184, first outer portion 180, and second outer portion 182 are individual pieces joined together to form the cab lower surface 140. In one embodiment, the center tunnel 184 is secured to the first outer portion 180 and the second outer portion 182 using welding. As shown in FIG. 12, the first outer portion 180 includes a tunnel connection area 246 with a curvature matching a corresponding hull connection area 244 on the center tunnel 184. The second outer portion 182 includes a similar tunnel connection area corresponding to a second hull connection area on the center tunnel 184. The corresponding curvature between the tunnel connection area 246 and the hull connection area 244 defines a secure connection between the first outer portion 180 and the center tunnel 184 by providing parallel portions of the two surfaces for the fastening. In other embodiments, the center tunnel 184 may be joined to the first outer portion 180 and the second outer portion 182 using other structures such as fasteners, tabs in the center tunnel 184 that fit into slots in the first outer portion 180 and the second outer portion 182, or other methods of joining the portions together. A cab lower surface 140 formed from separate pieces is easier to manufacture than an integrally formed cab lower surface 140 and, if transported before assembly, is easier to transport.

As shown in FIG. 8, when the cab lower surface 140 is formed, the rear panel connection area 258 of the first outer portion 180, the center tunnel rear edge 216 of the center tunnel 184 and the rear panel connection area 272 of the second outer portion 182 are generally aligned. The right hull front plane 202, the center tunnel front edge 214, and the left hull front plane 274, however, may not be at the same height. Generally, the first outer portion 180 and the second outer portion 182 are sized such that the right hull front panel connection area 270 and the left hull front plane 274 are aligned with one another parallel to the transverse axis of the cab. The center tunnel front edge 214 may meet with a right hull interior panel connection area 264 on the first outer portion 180 and a left hull interior panel connection area 262 on the second outer portion 182.

Once the cab lower surface 140 is formed, the interior floor is mounted into the cab lower surface 140. Turning to FIG. 16, the interior floor 242 generally provides a flat surface within the first outer portion 180. In some implementations, the floor panels of the interior floor 242 may be mounted at approximately the same distance from a lower boundary of the first outer portion 180 (e.g., the right hull lower boundary 194) such that the entirety of the interior floor 242 provides a substantially level surface. In other implementations, some floor panels of the interior floor 242 may be located at different heights above the right hull lower boundary 194, such that the interior floor 242 has several different heights. Generally, even if, as shown in FIG. 16, the center floor panel 298 and side braced floor panel 300 are at different heights, the center floor panel 298 still provides a level surface and the side braced floor panel 300 still provides a level surface. In other instances, the floor panels can be configured to provide a multilevel tiered surface.

The interior floor 242 is connected to the first outer portion 180 by side braced floor panel 304, side braced floor panel 300, side mounting structure 306, and side mounting structure 308. The interior floor 242 may be assembled before being placed into the first outer portion 180. For example, the center floor panel 298, side braced floor panel 300, center floor panel 302, and side braced floor panel 304 may be connected by panel mounting structures as described above. When placed into the first outer portion 180, the side bracing portion 336 and the side bracing portion 342 of the side braced floor panel 300 and the side bracing portion 334 and the side bracing portion 340 of the side braced floor panel 304 meet the interior surface of the first outer portion 180 (e.g., the right hull interior surface 248). The various side bracing portions may be used to secure the interior floor 242 to the first outer portion 180 (e.g., by welding bracing arm 346 and bracing arm 348 to the interior surface of the first outer portion 180) or may remain unattached to the first outer portion 180.

As the interior floor 242 is placed in the first outer portion 180, the side mounting structure 306 and side mounting structure 308 are aligned to attach the center floor panel 298 to the first outer portion 180. For example, side mounting structure 306 includes a mounting bracket 354 that may be shaped to match the curvature of the first outer portion 180. The mounting bracket 354 may be welded or otherwise attached to the interior surface of the first outer portion 180. When the center floor panel 298 is placed in the first outer portion 180, the mounting tab 352 aligns with the mounting bracket 354 and the bolt 356 is used to secure the mounting tab 352 to the mounting bracket 354. Similar structures may compose the side mounting structure 308. Another interior floor, substantially similar to the interior floor 242, may be installed in the second outer portion 182 to provide a left interior floor in the armored cab 102.

Figure 2:
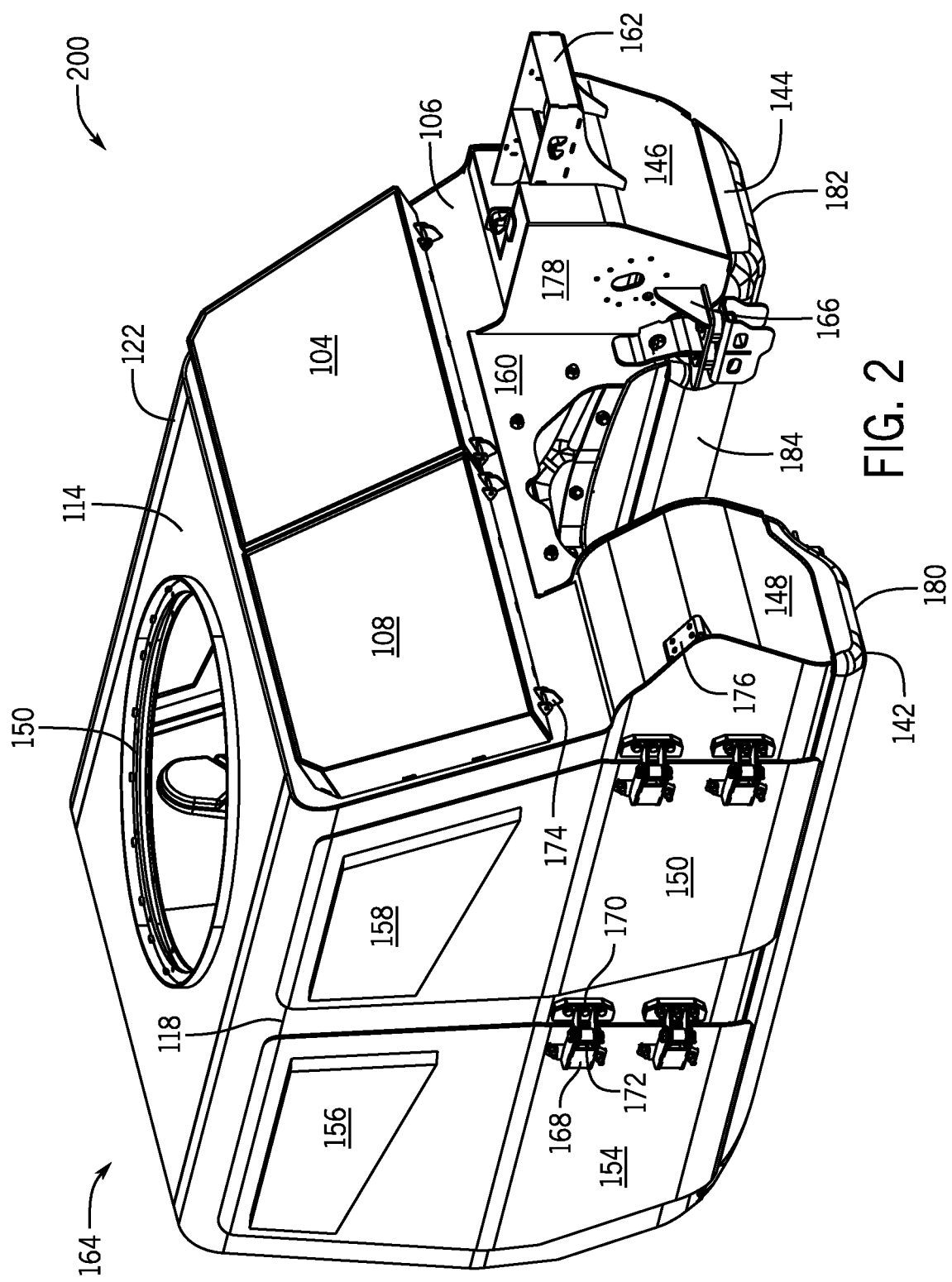
FIG. 2 illustrates a perspective view of an armored cab.
Figure 3:
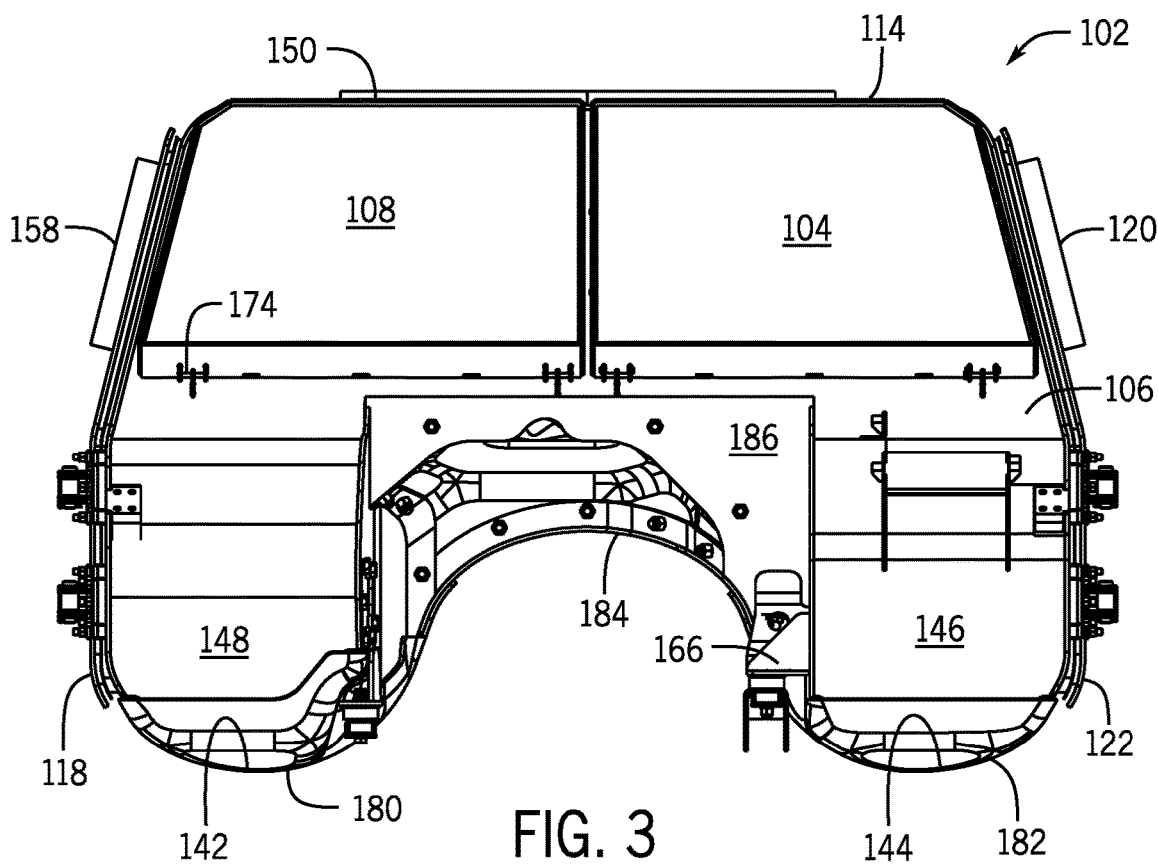
FIG. 3 illustrates a front plane view of an armored cab.

As shown in FIG. 2, the cab lower surface 140 is attached to other panels and structures to form an armored cab 102. In an illustrative implementation, a right side panel (e.g., the right side frame 118) and a left side panel (e.g., a left side frame 122) are connected to the cab lower surface 140 to form the sides of the armored cab 102. In some implementations, the right side frame 118 and left side frame 122 include curved portions that correspond to the curvature of the right hull 142 and the left hull 144 respectively, such that a portion of the right side frame 118 fits within the right hull 142 and the remainder of the right side frame 118 extends from the right hull peripheral edge 254. The left side frame 122 may be similarly attached or connected to the left hull 144 at the left hull peripheral edge 256. In other implementations, the right side frame 118 may be welded, bolted, or otherwise fastened to the cab lower surface 140 at a right side panel connection area. Similarly, the left side frame 122 may be attached to the left hull 144 at a left side panel connection area 260.

Figure 4:
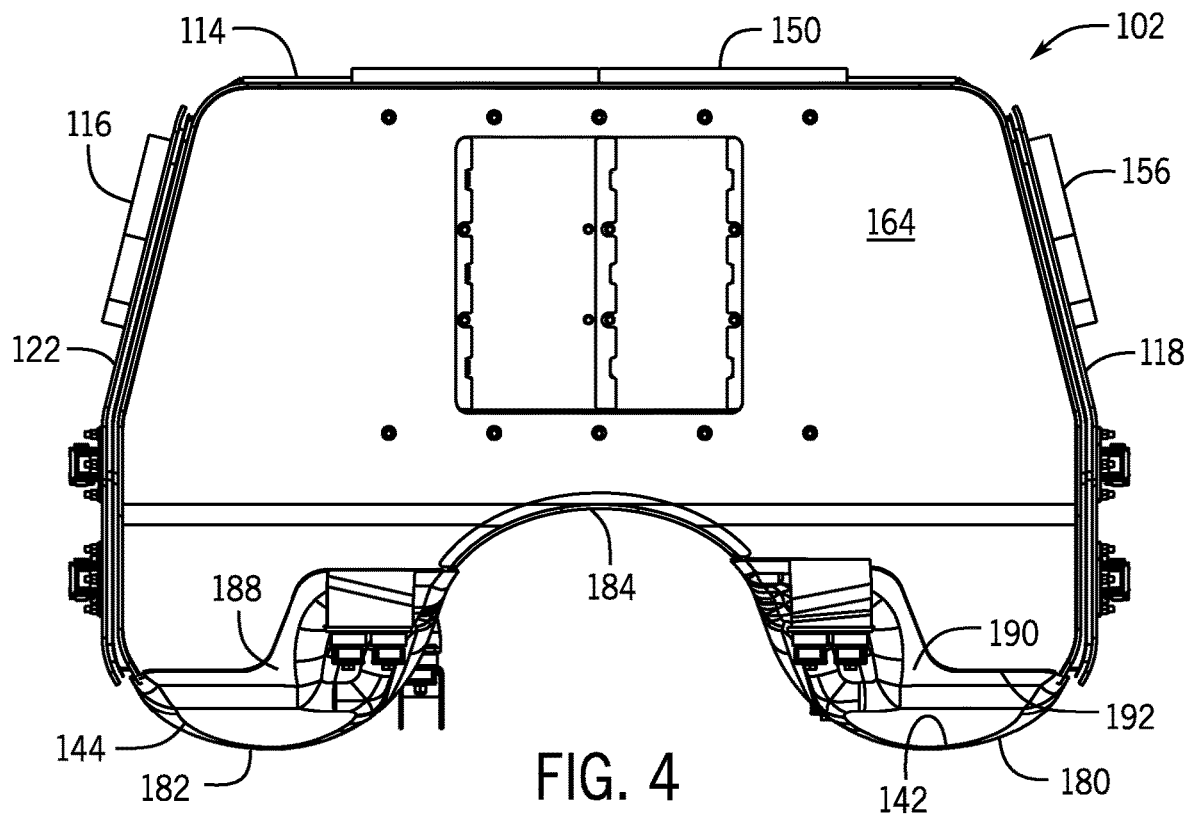
FIG. 4 illustrates a rear plane view of an armored cab.
Figure 5:
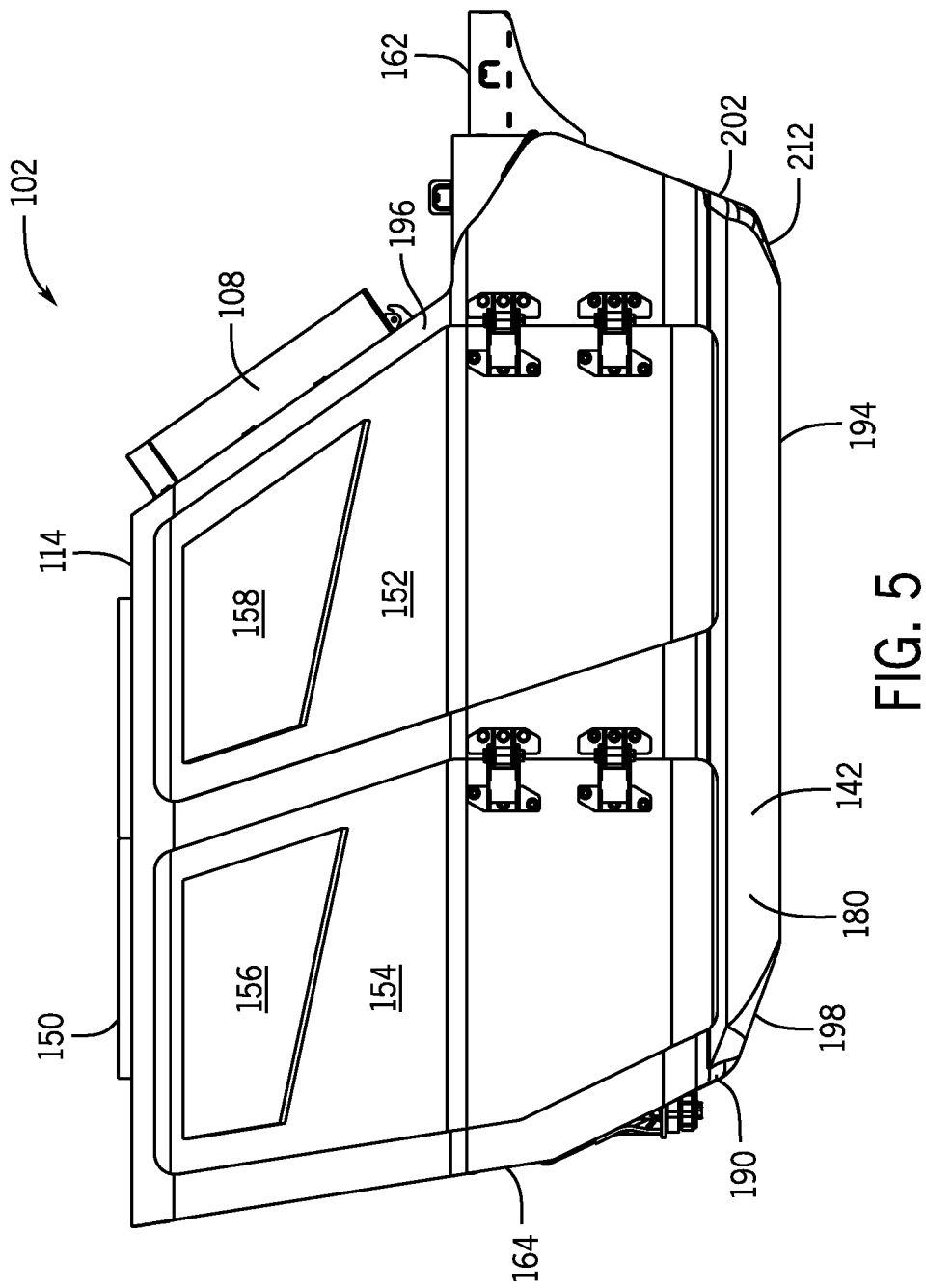
FIG. 5 illustrates a right side plane view of an armored cab.

A right hull front panel 148 is connected to the first outer portion 180 at a right hull front panel connection area 270 in a similar manner as the right side frame 118 and then attached to the right side frame 118 by, for example, a connector 236. A left hull front panel 146 is connected to the second outer portion 182 in a similar manner at a left hull front panel connection area 268. A center tunnel front panel 160, left hull interior panel 178, and a right hull interior panel may be connected between the right hull front panel 148 and left hull front panel 146 to form a front portion of the armored cab 102. A roof panel 114 extends between the right side frame 118 and left side frame 122. A windshield panel 106 connects to the roof panel 114, right side frame 118, left side frame 122, right hull front panel 148, and center tunnel front panel 160. As shown in FIG. 4, a rear panel 164 connects to the center tunnel 184, first outer portion 180, and second outer portion 182 to complete the armored cab 102. Additional structures, such as left hull top mount 162 and left hull side mount 166 may be added to the armored cab 102 to facilitate connection of the armored cab 102 to a vehicle chassis, as shown in FIG. 1.

Figure 7:
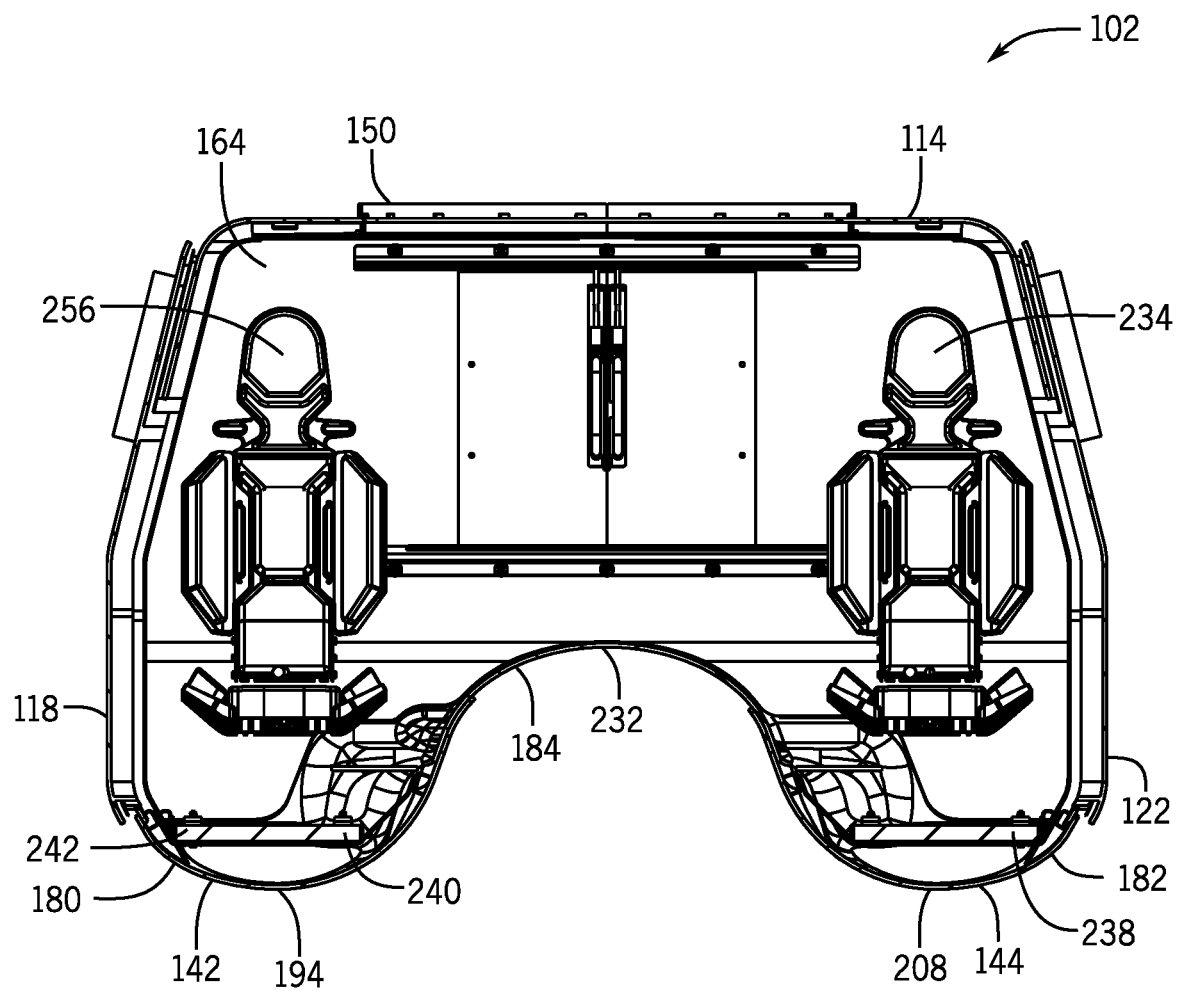
FIG. 7 illustrates a section view of an armored cab, taken along section line 7-7 of FIG. 6.

In other implementations, a cab lower surface 140 may be attached to a complete armored vehicle shell. The cab lower surface 140 may be formed to connect to a stock armored vehicle shell using welding, bolts, mounting brackets, or other structures. Generally, the completed armored cab 102 will include a right side panel, a left side panel, a front portion, a rear panel, and a roof panel. When the armored cab 102 is assembled by attaching the cab lower surface 140 to other portions of the armored cab 102, additional structures may be added to the armored cab 102. For example, as shown in FIG. 7, a passenger seat 236 may be mounted on the interior floor 242 and a passenger seat 234 may be mounted on a left interior floor 238. Additional elements, such as right windshield 108, left windshield 104, doors 110, 112, 152, and 154 may also be added to the armored cab 102. The armored cab 102 is mounted to a chassis to form the armored vehicle 100.

The armored cab 102 is designed to improve performance of the armored vehicle 100 in the event of an explosion beneath the armored vehicle 100. Specifically, the shape of the cab lower surface 140 provides a decreased impact of an explosion to occupants of the armored vehicle 100 by reducing deformation and failure of the cab lower surface 140. Portions of the cab lower surface 140 may also be designed to deform in a manner that is less likely to injure occupants of the armored vehicle 100.

The center tunnel 184 is generally shaped such that the center tunnel 184 withstands pressure and directs a blast away from the cab in the event of an explosion beneath the armored vehicle 100. The elliptically curved shape of the center tunnel 184 decreases chances of material failure due to stress concentrations, which are generally present at abrupt edges. The gradual slope of the center tunnel 184 provides for stress distributions within the center tunnel 184 as hoop stress, reducing deflection and failure in the center tunnel 184 as a result of an explosion beneath the center tunnel 184.

The center tunnel 184 is shaped to act similarly to a pressure vessel in response to an increased pressure (e.g., an explosion) under the center tunnel 184. As described above, the exterior curvature of the center tunnel 184 is generally smooth and concave with respect to the ground below the armored vehicle 100. Consequently, when an explosion occurs below the center tunnel 184, stress from the change in pressure is distributed as hoop stress within the center tunnel 184 such that the center tunnel 184 does not deform or otherwise fail in response to the explosion. The "tunnel" shape of the center tunnel 184 also allows for some directing of an explosion away from the first outer portion 180 and second outer portion 182 and towards the rear of the armored vehicle 100.

The first outer portion 180 and second outer portion 182 are also shaped to protect occupants of the armored vehicle 100. Generally, the first outer portion 180 and second outer portion 182 are curved to reduce stress concentrations in the first outer portion 180 and second outer portion 182 that may lead to rupture or failure of the cab lower surface 140. Further, the convex exterior curvature of the first outer portion 180 and second outer portion 182 reduces deformation due to explosions.

In implementations including a first interior floor and a second interior floor, the convex exterior curvature of the first outer portion 180 and second outer portion 182 allows for some deformation of the first outer portion 180 and second outer portion 182 without significantly affecting occupants of the armored vehicle 100. Using the first outer portion 180 as an example, because the floor of the cabin is formed by the first interior floor, the first outer portion 180 can deform between a lower boundary of the exterior curvature and the first interior floor with less impact on occupants of the armored vehicle 100. Specifically, the first outer portion 180 may deform without large displacements of the first interior floor, leading to fewer injuries to occupants who may be, for example, resting their feet on the first interior floor.

Figure 18:
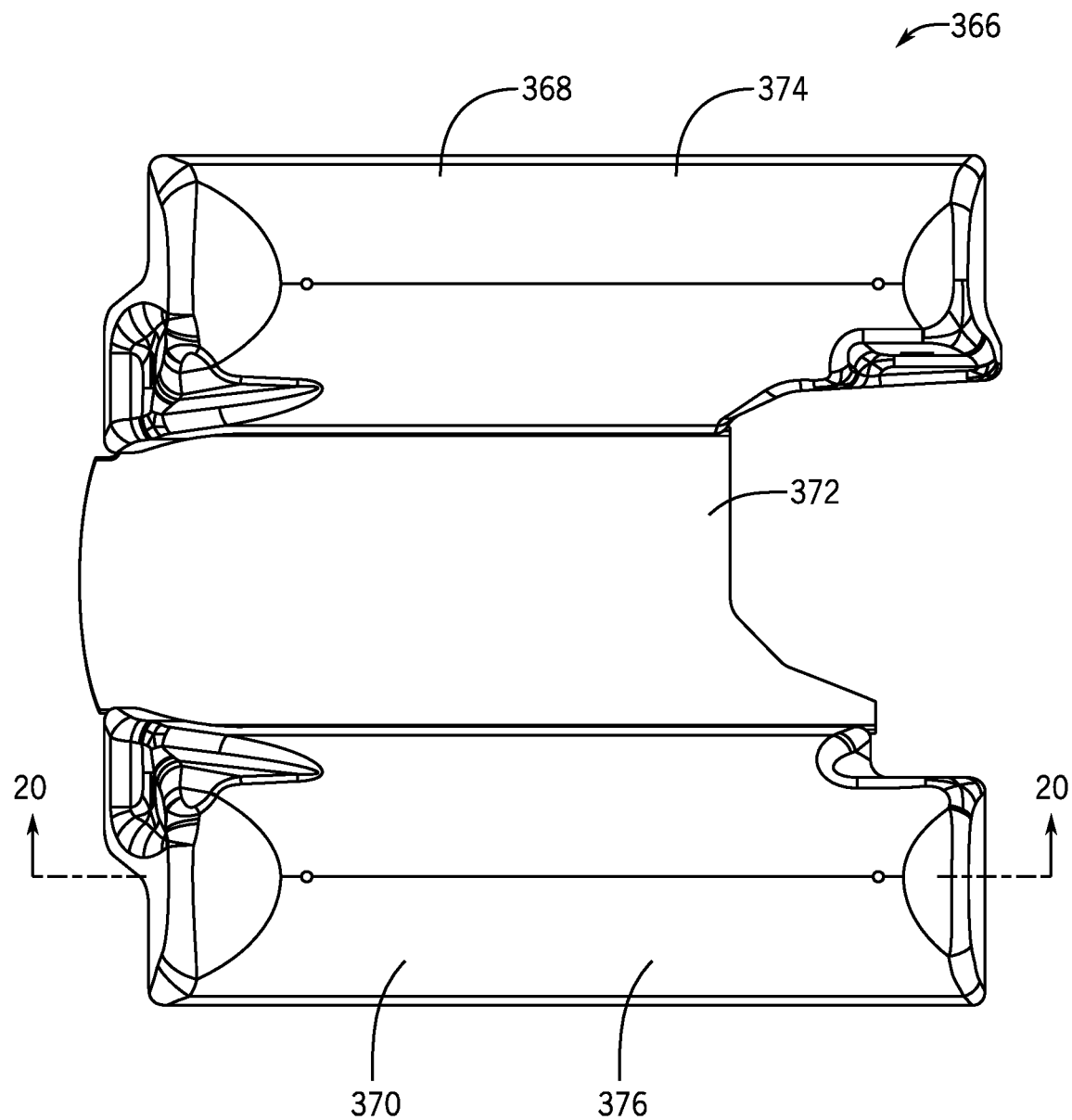
FIG. 18 illustrates a bottom plan view of an example cab lower surface.
Figure 19:
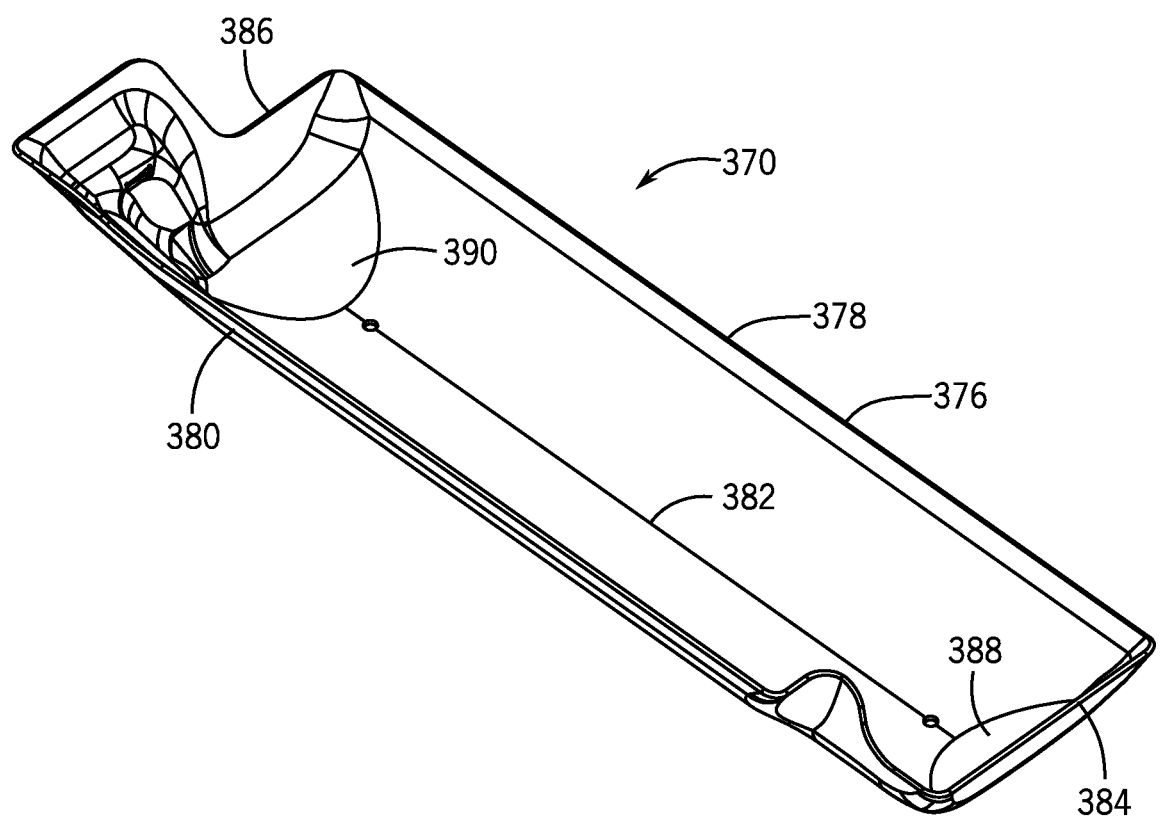
FIG. 19 illustrates a perspective view of an outer portion of an example cab lower surface.
Figure 20:
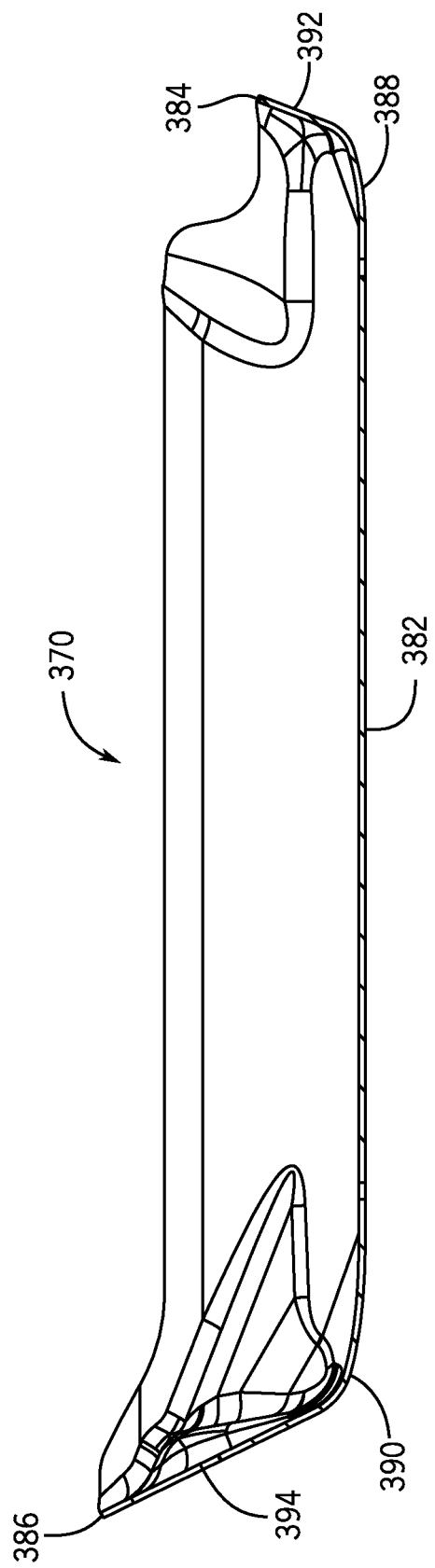
FIG. 20 illustrates a section view of a cab lower surface, taken along section line 20-20 of FIG. 18.

Other variations of a cab lower surface may act similarly to protect occupants of an armored cab. For example, FIGS. 18-20 show a cab lower surface 366, which may be substantially similar to cab lower surface 144, but may include a varied curvature and transitions between the bottom lower boundary and the curved outer portions. Like the cab lower surface 140, the cab lower surface 366 includes a first outer portion 368 and a second outer portion 370 joined to a center tunnel 372. The center tunnel 372 may be implemented by any of the structures described with respect to the center tunnel 252.

As shown in FIG. 18, the first outer portion 368 is implemented by a hull 374 and the second outer portion 370 is implemented by a hull 376. The hull 374 and the hull 376 may be, in some examples, mirrored with respect to one another. In some implementations, the hull 374 and the hull 376 may mirror one another with minor variations in curvature to accommodate, for example, a chassis of a vehicle, mounted weaponry, or other features of an armored vehicle.

The second outer portion 370, implemented by the hull 376 is shown in more detail in FIGS. 19 and 20. The second outer portion 370 is similar to the second outer portion 182. For example, the hull 376, like the hull 144, has a generally convex curvature with respect to the exterior of the cab extending from an edge 378 to an edge 380. A lower boundary 382 forms the lowest portion of the hull 376. The hull also includes opposing edges 384 and 386, with a curved portion 388 extending between the lower boundary 382 and the edge 384 and a curved portion 390 extending between the lower boundary 382 and the edge 386.

Figure 15:
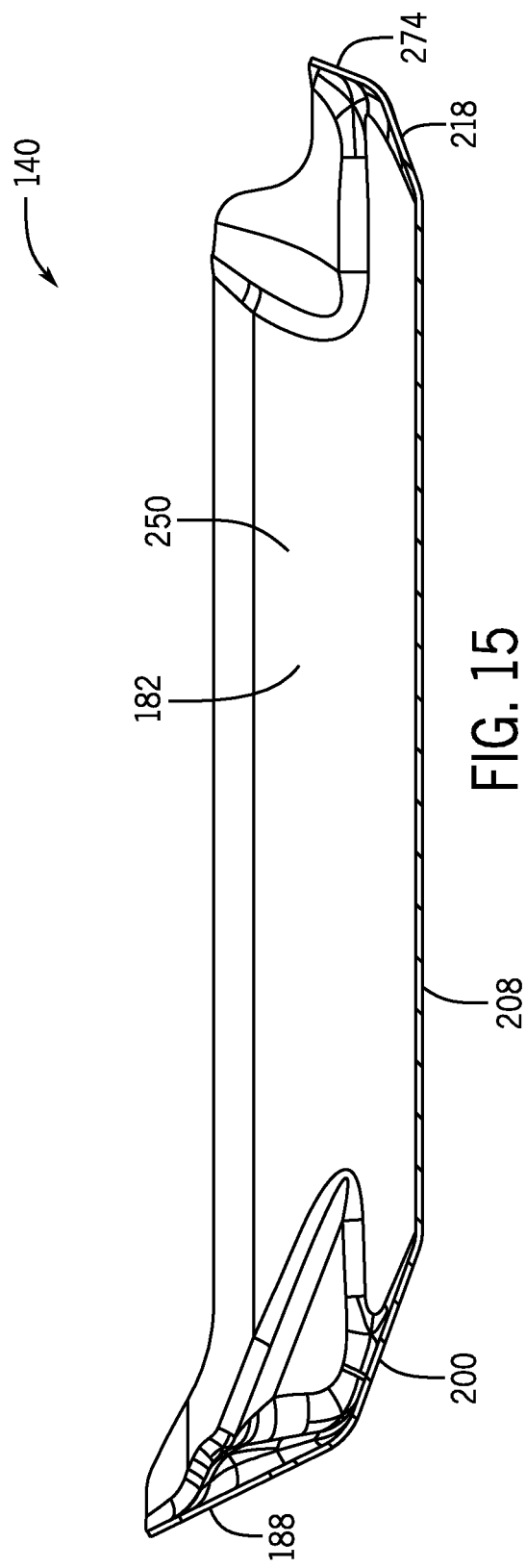
FIG. 15 illustrates a section view of a cab lower surface, taken along section line 15-15 of FIG. 10.

As shown in FIG. 20, the hull 376, like the hull 144 includes a plane 392 to facilitate connection of a front panel of the armored cab and a plane 394 to facilitate connection of a rear panel of the armored cab. Where the hull 144, shown in FIG. 15, includes transition planes and fillets extending from a lower boundary to the respective planes, the hull 376 includes the curved portion 388 extending between the lower boundary 382 and the plane 392 and the curved portion 390 extending between the lower boundary 382 and the plane 394. Put another way, the hull 144 shown in FIG. 15 may include two inflection points between the lower boundary 208 and the plane 188 and may also include two inflection points between the lower boundary 208 and the plane 274. For example, there may be two inflection points that result in a change of angle and direction for the hull 144. On the contrary, the hull 376 may include a smooth transition with a single extended inflection point or have a smooth transition between the lower boundary 382 and the planes 392 and 394. In this manner, the hull 376 may have a generally smooth convex curvature as it transitions to the planes, which assists in reducing stress concentrations compared to other geometries. As an example, the smooth curvature in connecting the lower boundary to the planes 392 and 394 helps to reduce the chances of material failure in the event of an explosion below the hull 376, such as by eliminating stress concentration locations and the like. The cab lower portion 366 and outer portion 370 shown in FIGS. 18-20 provides one example of how the geometry of the cab lower portion may vary from the cab lower portion 140. Other variations are possible within the scope of this disclosure.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An armored cab having a longitudinal axis and a transverse axis, the armored cab comprising:
    a right side frame extending parallel to the longitudinal axis;
    a left side frame extending parallel to the longitudinal axis; and
    a cab lower surface extending from the right side frame to the left side frame comprising:
        a right hull transitioning at a right inflection point to define an integral right front plane defining a forward facing surface of the right side frame, wherein the right front plane is convexly curved upwards,
        a left hull transitioning at a left inflection point to define an integral left front plane defining a forward facing surface of the left side frame, wherein the left front plane is convexly curved upwards, and
        a center tunnel having a center tunnel right edge coupled to a first outer portion, the center tunnel having an exterior curvature with a variable radius extending upward along the transverse axis of the armored cab from the center tunnel right edge to a center tunnel upper boundary and downward from the center tunnel upper boundary to a center tunnel left edge coupled to a second outer portion, wherein the first outer portion and the second outer portion each have a convex exterior curvature along the transverse axis of the armored cab.

2. The armored cab of claim 1, wherein the first outer portion includes a first outer portion lower boundary and the second outer portion includes a second outer portion lower boundary, the first outer portion lower boundary and the second outer portion lower boundary being equidistant from the center tunnel upper boundary.

3. The armored cab of claim 2, wherein a first interior floor is mounted within the first outer portion above the first outer portion lower boundary and a second interior floor is mounted within the second outer portion above the second outer portion lower boundary.

4. The armored cab of claim 1, wherein the exterior curvature of the center tunnel is an elliptical exterior curvature.

5. The armored cab of claim 4, wherein the elliptical exterior curvature forms a portion of an elliptical cylinder.

6. The armored cab of claim 1, wherein the cab lower surface is formed from one sheet of material.

7. The armored cab of claim 1, wherein the cab lower surface is configured to act as a pressure vessel in the event of an explosion beneath the armored cab.

8. A cab lower surface for an armored cab comprising:
a right hull having a right hull peripheral edge configured to couple to a right side frame of the armored cab, a right hull interior edge, and a right hull lower boundary located between the right hull peripheral edge and the right hull interior edge;
a center tunnel extending from the right hull interior edge and having an elliptical exterior curvature, wherein the center tunnel includes a center tunnel upper boundary coincident with a longitudinal axis along an entire length of the cab lower surface;
a left hull extending from the center tunnel, the left hull having a left hull interior edge coupled to the center tunnel, a left hull peripheral edge configured to couple to a left side frame of the armored cab, and a left hull lower boundary located between the left hull interior edge and the left hull peripheral edge;
a right interior floor extending from the right hull peripheral edge to the right hull interior edge and spaced above the right hull lower boundary; and
a left interior floor extending from the left hull peripheral edge to the left hull interior edge and spaced above the left hull lower boundary.

9. The cab lower surface of claim 8, wherein the right hull lower boundary and the left hull lower boundary are equidistant from the center tunnel upper boundary.

10. The cab lower surface of claim 8, wherein the elliptical exterior curvature of the center tunnel is defined such that a first radius between a center point of the elliptical exterior curvature and the right hull interior edge is equal to a second radius between the center point and the left hull interior edge, the first radius and the second radius being larger than a radius between the center point and any other point of the elliptical exterior curvature.

11. The cab lower surface of claim 10, wherein the elliptical exterior curvature is further defined such that a third radius between the center point and the center tunnel upper boundary is smaller than the radius between the center point and any other point of the elliptical exterior curvature.

12. The cab lower surface of claim 8, further comprising:
a right interior floor extending between the right hull peripheral edge and the right hull interior edge above the right hull lower boundary; and
a left interior floor extending between the left hull peripheral edge and the left hull interior edge above the left hull lower boundary.

13. The cab lower surface of claim 12, wherein
the right hull convex exterior curvature is configured to deform in the event of an explosion such that the right interior floor remains substantially stationary; and
the left hull convex exterior curvature is configured to deform in the event of an explosion such that the left interior floor remains substantially stationary.

14. The cab lower surface of claim 8, wherein an exterior curvature of the right hull and the left hull is an elliptical exterior curvature.

15. An exterior shell for an armored cab having a longitudinal axis and a transverse axis comprising:
a right side panel extending parallel to the longitudinal axis;
a left side panel extending parallel to the longitudinal axis;
a rear panel extending parallel to the transverse axis; and
a cab lower surface extending between the right side panel and the left side panel, the cab lower surface comprising:
a right hull transitioning at a right inflection point to define an integral right front plane defining a forward facing surface of the right side frame, wherein the right front plane is convexly curved upwards,
a left transitioning at a left inflection point to define an integral left front plane defining a forward facing surface of the left side frame, wherein the left front plane is convexly curved upwards, and
a center tunnel extending along the longitudinal axis, the center tunnel having an exterior curvature with a variable radius as the center tunnel extends along the transverse axis of the exterior shell, wherein the center tunnel is configured to act as a pressure vessel in the event of an explosion beneath the armored cab.

16. The exterior shell of claim 15, further comprising:
a first outer portion extending from a center tunnel right edge of the center tunnel to the right side panel of the exterior shell; and
a second outer portion extending from a center tunnel left edge of the center tunnel to the left side panel of the exterior shell.

17. The exterior shell of claim 16, wherein the first outer portion and the second outer portion each have a convex exterior curvature.

18. The exterior shell of claim 15, wherein the cab lower surface is formed from one sheet of material.

19. The exterior shell of claim 15, wherein the exterior curvature of the center tunnel is an elliptical exterior curvature.

* * * * *